US011363501B2

(12) United States Patent
Rangaraju et al.

(10) Patent No.: US 11,363,501 B2
(45) Date of Patent: Jun. 14, 2022

(54) INTELLIGENT CONNECTIVITY SWITCHING MECHANISMS

(71) Applicant: QUALCOMM Incorporated, San Diego, CA (US)

(72) Inventors: Karthik Rangaraju, Hyderabad (IN); Shirish Kumar Agarwal, Hyderabad (IN); Narasimhan Venkata Agaram, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/727,725

(22) Filed: Dec. 26, 2019

(65) Prior Publication Data

US 2021/0204175 A1 Jul. 1, 2021

(51) Int. Cl.
*H04W 36/00* (2009.01)
*H04W 12/037* (2021.01)

(52) U.S. Cl.
CPC ..... *H04W 36/0022* (2013.01); *H04W 12/037* (2021.01); *H04W 36/00835* (2018.08); *H04W 36/00837* (2018.08)

(58) Field of Classification Search
CPC ......... H04W 36/0005; H04W 36/0022; H04W 36/0033; H04W 48/16; H04W 12/0401; H04W 12/10; H04W 36/0038
See application file for complete search history.

(56) References Cited

U.S. PATENT DOCUMENTS

| | | | | |
|---|---|---|---|---|
| 10,492,072 | B1* | 11/2019 | Sokolov | H04W 12/08 |
| 2007/0140220 | A1* | 6/2007 | Doradla | H04L 12/5692 370/352 |
| 2008/0080457 | A1* | 4/2008 | Cole | H04L 12/5692 370/342 |
| 2008/0159245 | A1 | 7/2008 | Benn et al. | |
| 2010/0099405 | A1* | 4/2010 | Brisebois | H04L 41/0893 455/434 |
| 2010/0128608 | A1* | 5/2010 | Zou | H04W 36/06 370/237 |

(Continued)

FOREIGN PATENT DOCUMENTS

CN 104902479 A 9/2015

OTHER PUBLICATIONS

International Search Report and Written Opinion—PCT/US2020/062704—ISA/EPO—dated Mar. 9, 2021.

*Primary Examiner* — Khalid W Shaheed
(74) *Attorney, Agent, or Firm* — Qualcomm Incorporated

(57) ABSTRACT

This disclosure provides systems, methods and apparatuses for intelligent connectivity switching techniques. The techniques include, for example, determining that a wireless connection is encrypted, and in response to determining that the wireless connection is encrypted, employing one or more intelligent connectivity switching mechanisms to ensure a desirable level of user experience may be maintained and data stall conditions may be avoided or overcome. When a wireless station is in an area where two radio access technology (RAT) connections are present, the intelligent connectivity switching mechanisms can include responding to a user interface prompt, evaluating one or more signal-to-noise (SNR)-related metrics, or comparing an application, task or activity to a whitelist.

41 Claims, 7 Drawing Sheets

(56) References Cited

U.S. PATENT DOCUMENTS

| | | | | |
|---|---|---|---|---|
| 2011/0026503 A1* | 2/2011 | Mueck | ............... | H04W 72/0406 370/338 |
| 2011/0116629 A1* | 5/2011 | Forsberg | ............... | H04W 12/04 380/44 |
| 2012/0269095 A1* | 10/2012 | Dalsgaard | ............. | H04W 48/16 370/255 |
| 2014/0301214 A1* | 10/2014 | Zhang | ................... | H04W 36/26 370/252 |
| 2015/0172968 A1* | 6/2015 | Lund | ................. | H04W 36/0066 455/411 |
| 2015/0197010 A1* | 7/2015 | Ruuspakka | ........... | G05D 1/0005 700/245 |
| 2016/0021146 A1* | 1/2016 | Mufti | .................. | H04L 65/1016 370/328 |
| 2016/0029279 A1* | 1/2016 | Bellamkonda | ........ | H04W 36/30 455/436 |
| 2017/0034753 A1* | 2/2017 | Yang | ..................... | H04W 36/28 |
| 2017/0041325 A1 | 2/2017 | Yang et al. | | |
| 2017/0272995 A1 | 9/2017 | Kim et al. | | |
| 2018/0041901 A1* | 2/2018 | Yilmaz | ................. | H04W 12/10 |
| 2018/0254957 A1* | 9/2018 | Markham | ............. | H04L 41/145 |
| 2018/0352597 A1 | 12/2018 | Bostick et al. | | |
| 2019/0109767 A1* | 4/2019 | Lin | ....................... | H04W 88/02 |
| 2019/0215700 A1* | 7/2019 | Sofuoglu | ............ | H04W 36/165 |

\* cited by examiner

| | Whitelisted? | SNR (dB) | RSRP (dBm) | RSRQ (dB) | SINR (dB) | Snooze (secs) | Ping Latency and Throughput | User Prompt | Switch RATs? |
|---|---|---|---|---|---|---|---|---|---|
| Scenario 1 | Yes | 40dB | Excellent (>= -80) | Excellent (>= -10) | Excellent (>= 20) | Indefinite | Good and sufficient | No | No, as application is whitelisted. |
| Scenario 2 | No | 40dB | Excellent (>= -80) | Excellent (>= -10) | Excellent (>= 20) | During application usage. | Good and sufficient | No | Maybe, after exiting application. |
| Scenario 3 | No | 25 to 40dB | Good (-80 to -90) | Good (-10 to -15) | Good (13 to 20) | 300 sec | Good and sufficient | Yes | Wait for 300 second timeout period before another user prompt. |
| Scenario 4 | No | 15 to 25dB | Mid cell (-90 to -100) | Mid cell (-15 to -20) | Mid cell (0 to 13) | 60 sec | Good and sufficient | Yes | Wait for 60 second timeout period before another user prompt. |
| Scenario 5 | No | 10 to 15dB | Cell edge < -100 | Cell edge < -20 | Cell edge <= 0 | 10 sec | Good and sufficient | Yes | Wait for 10 second timeout period before another user prompt. |
| Scenario 6 | No | 5 to 10dB | Cell edge < -100 | Cell edge < -20 | Cell edge <= 0 | 0 sec | Bad and inadequate | Yes | Yes, immediately upon selection of user prompt. |

INTELLIGENT CONNECTIVITY SWITCHING MECHANISMS

TECHNICAL FIELD

Aspects of the present disclosure relate generally to wireless communication, and more particularly to techniques for intelligent connectivity switching mechanisms when encountering wireless local area network (WLAN) and wireless wide area network (WWAN) overlapping coverage areas.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, Long Term Evolution (LTE) and fifth generation (5G) New Radio (NR).

A wireless communication network, such as a wireless local area network (WLAN) or a wireless wide area network (WWAN), may include a number of access points (APs) or base stations (BSs) that can support communication for a number of wireless stations (STAs, also referred to as user equipment (UEs), wireless devices or mobile devices, etc.). The deployment of WLANs in the home, the office, and various public facilities is commonplace today. Such networks typically employ a wireless AP that connects a number of STAs in a specific locality (such as a home, office, public facility, etc.) to another network, such as the Internet. A set of STAs can communicate with each other through a common AP in what is referred to as a basic service set (BSS). Nearby BSSs may have overlapping coverage areas and such BSSs may be referred to as overlapping BSSs (OBSSs). A STA may communicate with an AP or BS via the downlink (DL) and uplink (UL). The DL (or forward link) refers to the communication link from the AP or BS to the STA, and the UL (or reverse link) refers to the communication link from the STA to the AP or BS. A BS may be referred to as a NodeB, an LTE evolved nodeB (eNB), a gNB, a radio head, a transmit receive point (TRP), a New Radio (NR) BS, a 5G NodeB, or the like.

STAs may use more than one modem to allow seamless connectivity for certain telecommunication services and applications. In some implementations, a STA may include a WLAN modem (such as a Wi-Fi modem) and a WWAN modem (such as a cellular modem) to enable such seamless connectivity. The STA may select between a WLAN and a WWAN for wireless communications based on the availability of the network, the data rates that can be achieved, and user preference.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by a device. The method may include establishing, at a wireless station, a first wireless connection with a first radio access technology (RAT) in a first coverage area while a second RAT is enabled at the wireless station; detecting a second RAT associated with a second coverage area, where the second coverage area overlaps with the first coverage area in an overlapping coverage area; determining if a second wireless connection with the second RAT in the overlapping coverage area is encrypted; and in response to determining that the second wireless connection is encrypted in the overlapping coverage area, activating a RAT switching mechanism.

In some aspects, the RAT switching mechanism is a user interface prompt. In some aspects, the user interface prompt enables selection of the second RAT. In some aspects, upon selection of the second RAT, further including switching, at the wireless station, from the first wireless connection with the first RAT to the second wireless connection with the second RAT. In some aspects, the user interface prompt enables dismissal of switching to the second wireless connection with the second RAT.

In some aspects, the user interface prompt enables deferment of switching to the second wireless connection with the second RAT for a period of time. In some aspects, the RAT switching mechanism is based on an signal-to-noise (SNR) threshold. The SNR threshold can be configured manually, or dynamically. In some aspects, if an SNR value of the first RAT exceeds the SNR threshold, maintaining the first wireless connection with the first RAT. In some aspects, if an SNR value of the first RAT is below the SNR threshold, switching from the first wireless connection with the first RAT to the second wireless connection with the second RAT.

In some aspects, switching from the first wireless connection with the first RAT to the second wireless connection with the second RAT is deferred for an amount of time. In some aspects, the amount of time is based on a lookup table. In some aspects, the lookup table includes one or more of the following values: the SNR value, a reference signal received power (RSRP) value, a reference signal received quality (RSRQ) value, and a signal-to-interference-plus-noise ratio (SINR) value, and a deferment time for each of the one or more of the following values.

In some aspects, activating the RAT switching mechanism includes comparing an active application at the wireless station to a whitelist; and if the active application is included in the whitelist, maintaining the first wireless connection with the first RAT; or if the active application is not included in the whitelist, switching from the first wireless connection with the first RAT to the second wireless connection with the second RAT. In some aspects, the active application includes one or more of the following: a gaming application, a banking application, a booking application, a digital wallet application, an e-pay application, and an e-commerce application.

In some aspects, the active application is a frequently used application at the wireless station. In some aspects, the active application maintains operation in a data rate, bandwidth or throughput-constrained environment. In some aspects, the first RAT is a wireless wide area network (WWAN) technology, and the second RAT is a wireless local area network (WLAN) technology. In some aspects, the WWAN technology is one of a Long Term Evolution (LTE) technology, or a fifth generation (5G) new radio (NR) technology.

In some aspects, determining if the second wireless connection with the second RAT in the overlapping coverage area is encrypted includes determining if the second wireless connection is a Hypertext Transfer Protocol Secure (HTTPS) connection. In some other implementations, determining if the second wireless connection with the second RAT in the overlapping coverage area is encrypted, or otherwise secure, can include determining if the Service Set Identifier (SSID) is encrypted (i.e., requires a password to access the communication technology). In some aspects, in response to determining that the second wireless connection is not encrypted in the overlapping coverage area, maintaining the first wireless connection with the first RAT. In some aspects, detecting the second RAT associated with the second coverage area, further includes determining if received signal strength indicator (RSSI) values from the second RAT exceed an RSSI value threshold.

In some aspects, the RAT switching mechanism is based on comparing costs associated with the first RAT with costs associated with the second RAT. In some aspects, the RAT switching mechanism is based on one or more RAT-based profile values, including: available throughput, available bandwidth, number of ports, history of connection with the first RAT in the first coverage area, costs associated with connectivity usage of the first RAT, latency values, congestion values, noise values, and location.

Another innovative aspect of the subject matter described in this disclosure can be implemented in a device for wireless communication. The device may include memory and one or more processors operatively coupled to the memory. The memory and the one or more processors may be configured to establish, at a wireless station, a first wireless connection with a first RAT in a first coverage area while a second RAT is enabled at the wireless station; detect a second RAT associated with a second coverage area, where the second coverage area overlaps with the first coverage area in an overlapping coverage area; determine if a second wireless connection with the second RAT in the overlapping coverage area is encrypted; and in response to determining that the second wireless connection is encrypted in the overlapping coverage area, activate a RAT switching mechanism.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a device, may cause the one or more processors to establish, at a wireless station, a first wireless connection with a first RAT in a first coverage area while a second RAT is enabled at the wireless station; detect a second RAT associated with a second coverage area, where the second coverage area overlaps with the first coverage area in an overlapping coverage area; determine if a second wireless connection with the second RAT in the overlapping coverage area is encrypted; and in response to determining that the second wireless connection is encrypted in the overlapping coverage area, activate a RAT switching mechanism.

Another innovative aspect of the subject matter described in this disclosure can be implemented in an apparatus for wireless communication. The apparatus may include means for means for establishing, at a wireless station, a first wireless connection with a first RAT in a first coverage area while a second RAT is enabled at the wireless station; detecting a second RAT associated with a second coverage area, where the second coverage area overlaps with the first coverage area in an overlapping coverage area; means for determining if a second wireless connection with the second RAT in the overlapping coverage area is encrypted; and in response to determining that the second wireless connection is encrypted in the overlapping coverage area, means for activating a RAT switching mechanism.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 3 shows an example lookup table where one or more SNR-related metrics may be stored.

Like reference numbers and designations in the various drawings indicate like elements.

DETAILED DESCRIPTION

Figure 1:
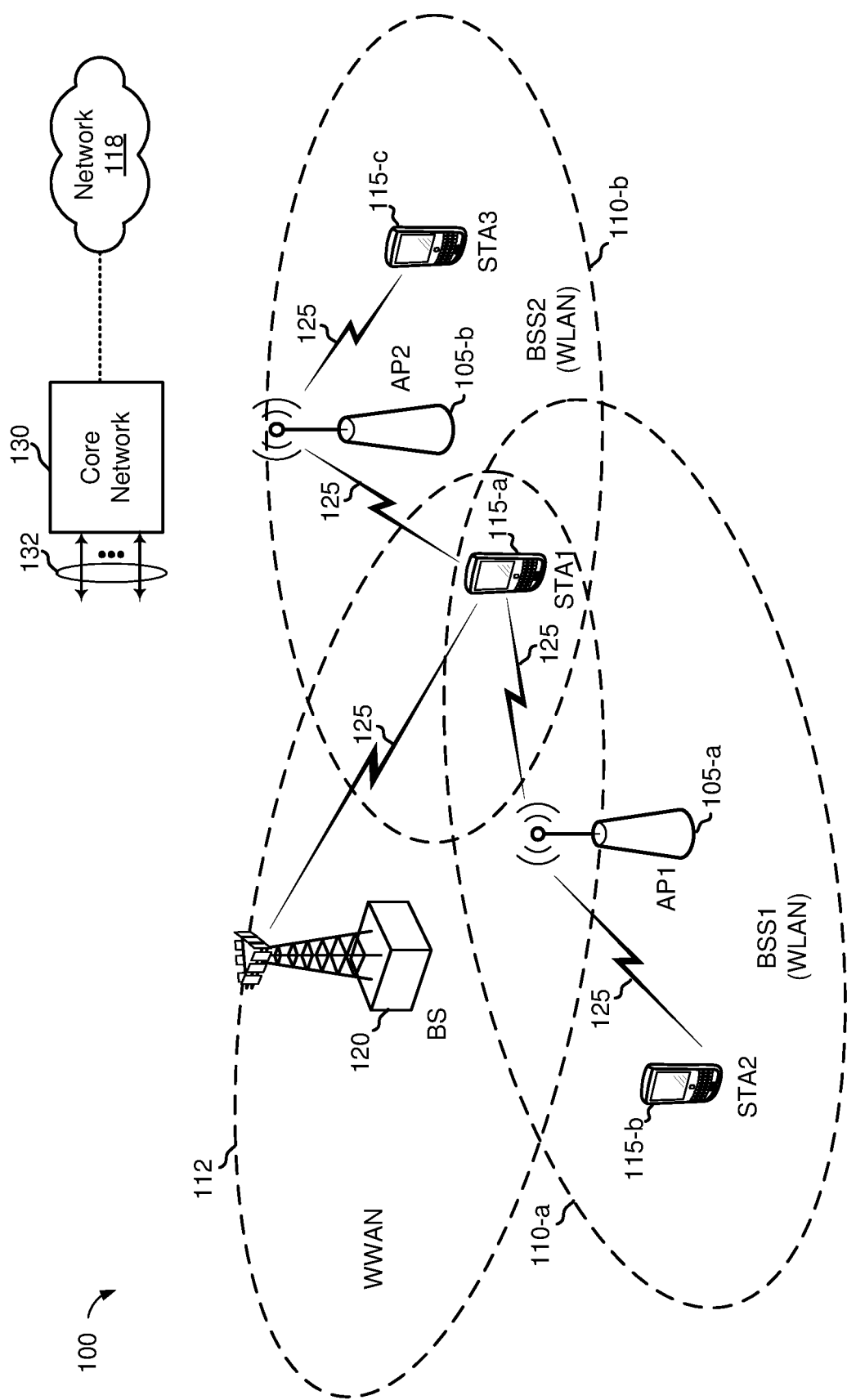
FIG. 1 shows a conceptual diagram illustrating an example of a wireless local area network (WLAN) deployment and a wireless wide area network (WWAN) deployment in connection with techniques for intelligent connectivity switching mechanisms.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Many wireless stations (STAs) include both a wireless local area network (WLAN, sometimes also referred to as a Wi-Fi network) modem (such as a Wi-Fi modem) and a wireless wide area network (WWAN, sometimes also referred to as a cellular network) modem (such as a cellular modem). Many users keep both the Wi-Fi radio access technology (RAT) functionality (for example, implemented as a Wi-Fi icon in the user interface of the STA), as well as the cellular RAT functionality (for example, implemented as a mobile data icon in the user interface of the STA) enabled on the STA throughout the day. By keeping both RAT functionalities enabled, the STA may be configured to connect with either the Wi-Fi RAT or the cellular RAT at different points during the day.

Thus, a STA may be able to connect to a first network device associated with a first radio access technology (RAT) (such as a base station (BS) in a cellular network) or to a second network device associated with a second RAT (such as an access point (AP) in a Wi-Fi network) to enable seamless wireless connectivity throughout the day. Seamless wireless connectivity may refer to the STA's ability to use different RATs to maintain a certain quality-of-service (QoS) or another metric that allows for a certain level of user experience to be met. For example, some STAs can determine whether to connect to either a cellular network device (such as a cellular BS) or a Wi-Fi network device (such as a Wi-Fi AP) based on the availability of cellular service or Wi-Fi connectivity at a particular location and time, data rates associated with the cellular service or Wi-Fi connectivity, or customized user settings in order to provide the needed connectivity for certain applications.

In some implementations, such as when a STA is in a zone where a Wi-Fi network coverage area overlaps with a cellular network coverage area, a user, a STA, or an operating system residing or associated with a STA, may be configured to prioritize or select an available Wi-Fi AP that can be authenticated over a cellular BS because Wi-Fi services tend to be less expensive (and in some implementations, free) relative to cellular services (such as subscription cellular network data communication plans).

However, since Wi-Fi networks generally have a smaller coverage area (or shorter range) than cellular networks, at the edge of the Wi-Fi network's coverage area, the STA may experience degraded communication properties because of the weak link (i.e., a link having poor quality metrics), low data rates while also experiencing high packet error rates (PER). In some cases (such as in a limited home network), there may not be other Wi-Fi APs nearby to enable the STA to roam in order to get better performance. In some implementations, the STA may remain connected to the Wi-Fi AP despite the limited (or no) access to data exchanges. In such cases, selecting, joining or switching to a Wi-Fi network (i.e., enabling Wi-Fi RAT connectivity) instead of a cellular network (i.e., enabling cellular RAT connectivity) may result in poor user experience. And because of the general preference for Wi-Fi networks, it is likely that the STA may remain connected to the Wi-Fi network despite the limited (or nor) access to data exchanges. Applications or transactions (including video, gaming, electronic commerce (e-commerce), banking, ticket booking, etc.) in use at the STA may not be processed properly, or run properly because of limited access (or even no access) to data exchanges, resulting in data stall or Wi-Fi data stall.

Conversely, in some implementations, a STA may be connected to a cellular network (such as an LTE, 4G, or 5G network) in a first coverage area. The STA may have both a Wi-Fi radio button (or Wi-Fi RAT) and mobile data radio button (or cellular RAT) enabled. When the STA enters a second coverage area associated with a Wi-Fi network, which overlaps with the first coverage area, and the Wi-Fi network is known to the STA (i.e., the Wi-Fi network credentials are saved at or by the STA), the STA may be configured to automatically switch connectivity to the Wi-Fi network. This can be problematic, especially if the STA is engaging in a critical transaction, such as a banking transfer (i.e., money is deducted from one account, but the transfer to another account is unsuccessful), an e-commerce order placement (i.e., money is deducted at the payment page, but the order is unsuccessful), a ticket booking system (i.e., an airline seat or bus seat fails to be reserved due to the network switch between the reservation page and the payment page), or engaging in an important activity to the user, such as gaming (i.e., the game is interrupted, resulting in a gaming character's demise) during the time of the automatic switching.

The present disclosure relates to techniques for intelligent connectivity switching mechanisms. The intelligent connectivity switching mechanisms can be employed when a STA enters a coverage area, an intersection, transition point or zone (i.e., data-fidelity or Data-Fi zone) where two or more RATs provide wireless connectivity. The intelligent connectivity switching mechanisms may enable the STA to intelligently select or switch between the RATs to provide for seamless wireless connectivity for the STA, and to avoid data stall or Wi-Fi data stall, as well as the poor user experiences associated therewith.

The techniques in this disclosure can be implemented to determine that wireless connectivity with the various RATs is secure (i.e., that the RAT is using encryption to protect the flow of data between a STA and a BS or AP) before engaging in one or more intelligent connectivity switching mechanisms. Upon determining that a connection with a RAT is encrypted, or otherwise secure, the STA can be implemented to activate one or more RAT switching mechanisms.

For example, upon detecting where wireless connectivity between two or more RATs is present and in an overlapping coverage area, a RAT switching mechanism can include providing a user interface prompt on the STA. The user interface prompt can indicate that the STA is in an overlapping coverage area, and can provide the user with various options, such as: maintaining connectivity with the first RAT, switching connectivity to the second RAT, dismissing an opportunity (i.e., dismissal) to switch connectivity to the second RAT, and deferring the opportunity (i.e., snoozing or deferment) to switch connectivity to the second RAT for a period of time. In some implementations, the period of time for deferment can be configurable, such as 1 second, 2 seconds, 5 seconds, 30 seconds, 1 minute, 2 minute, 5 minutes, 10 minutes, 20 minutes, etc. In some implementations, the user interface prompt can be manually selected by a user. In some other implementations, the user interface prompt can be configured to disappear after a period of time, such as 10 seconds, 15 seconds, etc., absent any manual user intervention.

One non-limiting example of where this RAT switching mechanism may be employed is when a user is on a crowded elevator lift in their office building, and heading from a lower floor to an upper floor (or vice versa). As the doors open to allow the other elevator riders to exit on their respective floor, the STA may automatically attempt to connect to the known Wi-Fi RAT on that particular floor. Since the elevator doors close shortly after the other riders exit, the STA may be stuck in a data stall scenario, i.e., connected to the Wi-Fi RAT on a different floor, but unable to gain any data services as the user is moving inside closed doors within the elevator shaft. By activating the user interface prompt RAT switching mechanism in this scenario, the STA can enable the user to snooze the switching from cellular connectivity to the known Wi-Fi RAT for a prescribed period of time, such as 30 seconds, or until the user exits the elevator on their own respective floor.

In another example, upon detecting where wireless connectivity between two or more RATs is present and in an overlapping coverage area, a RAT switching mechanism can include evaluating one or more signal-to-noise (SNR)-related metrics. Evaluating the one or more SNR-related metrics can include determining if the metrics exceed or are below a defined threshold. The various SNR-related metric thresholds can be statically (i.e., pre-configured or predetermined) or dynamically defined in one or more lookup tables or databases. In some implementations, the SNR-related metric thresholds can be user defined, or user configured. The STA can be implemented to monitor one or more SNR-related metrics, such as an SNR value, a reference signal received power (RSRP) value, a reference signal received quality (RSRQ) value, and a signal-to-interference-plus-noise ratio (SINR) value and compares the SNR-related metrics to a lookup table or database. Monitoring also can include monitoring uplink (UL) and downlink (DL) quality metrics, and network congestion metrics.

If the monitored SNR-related metric of the connected first RAT exceeds the particular threshold, the STA can be implemented to maintain the wireless connection with the connected first RAT. Alternatively, if the monitored SNR-related metric of the connected first RAT falls below the particular threshold, the STA can be implemented to switch connectivity to the second RAT. In some implementations, switching connectivity to the second RAT can be deferred for an amount of time. In some implementations, the deferred amount of time can be based on the lookup table or database, where each of the SNR-related metrics can be associated with a deferment time. In other words, even though the particular SNR-related metric associated with the first RAT is below the defined threshold, the STA can remain connected with the first RAT for a configurable amount of time, such as 1 second, 2 seconds, 5 seconds, 30 seconds, 1 minute, 2 minute, 5 minutes, 10 minutes, 20 minutes, etc.

In yet another example, upon detecting where wireless connectivity between two or more RATs is present and in an overlapping coverage area, a RAT switching mechanism can include comparing an application, task or transaction active on the STA to a whitelist. The whitelist can be configurable, such as pre-configured, or dynamically configured (including user configured), to selectively choose critical applications, tasks and transactions which if being presently used by the STA, should trigger an exemption from a network connectivity switch. As such, these critical applications, tasks and transactions may be prevented from disruption due to a network connectivity switch. Thus, if the active application, task or transaction is included on the whitelist, the STA may maintain its wireless connection with the first RAT. Alternatively, if the active application, task or transaction is not included on the whitelist, the STA may switch its wireless connection to the second RAT. In some implementations, an active application, task or transaction is an application, task or transaction that is currently being used at the STA. For example, "active" may refer to an application, task or transaction that is being used by the user. Additionally, "active" may refer to an application, task or transaction that is not being used, but is maintained actively on the STA, such as the application, task or transaction has one or more background features still in operation on the STA.

Some examples of active applications, tasks and transactions that may be included on the whitelist include: gaming-related, banking-related, booking or reservation-related, digital wallet-related, e-pay-related and e-commerce-related, among other such applications, tasks or transactions. Other user-level applications, also referred to as end-user programs or applications, that involve user participation such as, for example, browsers, word processors, databases, multimedia applications, etc. may be include on the whitelist. In some implementations, designation of an application, task or transaction as whitelisted may be based on the application, task or transaction being a frequently used application, task or transaction at the STA. In some implementations, if proper operation of the application, task or transaction can be maintained in a data rate, bandwidth or throughput-constrained connection environment, the STA can maintain its wireless connection with the first RAT. One non-limiting example of where this RAT switching mechanism may be employed is when a user is walking across the street and connected to a video call (such as via Skype, WhatsApp, Facebook, etc.). When the user enters the Data-Fi zone, the STA may attempt to make an abrupt switch from cellular connectivity to Wi-Fi connectivity (or vice versa), which will likely cause disruption on the video call. By activating the whitelisting RAT switching mechanism in this scenario (i.e., Skype, WhatsApp, Facebook, etc. are whitelisted apps), the STA can be configured to maintain the cellular connectivity service for the duration of the video call.

The present disclosure also describes various techniques for switching back from the WWAN to the WLAN network, and vice versa, when the appropriate conditions occur. Such conditions may include avoiding or minimizing the higher costs associated with WWAN services. For example, it may be desirable to switch wireless communications from a cellular BS back to a Wi-Fi AP, which could be the same or a different Wi-Fi AP from before (such as when the initial, or first switch occurred), once a Wi-Fi connection with the appropriate link quality metrics is identified. One reason for switching back to Wi-Fi network connectivity from cellular network connectivity is to minimize or reduce the use of higher operational costs associated with cellular network connectivity (such as higher cost of data plans in cellular services). In some implementations, the STA may remain connected to the Wi-Fi AP even after switching the wireless communications to the cellular BS.

In some implementations, a STA may intentionally disconnect from the Wi-Fi AP, even when the Wi-Fi AP can be detected, to enable a framework operating or executing on the STA to switch to a cellular BS to continue serving any existing wireless communications associated with one or more applications, tasks or transactions operating on the STA. By switching network connectivity from a Wi-Fi AP to cellular BS, a desirable level of user experience may be maintained and the data stall conditions may be avoided or overcome.

Particular implementations of the subject matter described in this disclosure can be implemented to realize one or more of the following potential advantages. The techniques may provide for customized intelligent connectivity switching mechanisms at the STA. Utilizing the techniques described herein may prevent data stall when a STA is in a coverage area where WLAN RAT connectivity services and WWAN RAT connectivity services overlap. Additionally, the techniques may prevent critical transactions occurring over the STA from being disrupted, thereby improving user experience. The techniques may delay switching from a WWAN RAT to a WLAN RAT, or vice versa, when a particular application or transaction is in use on the STA. Moreover, the techniques described herein may improve the operations of a STA by increasing the ability to select which communication service the STA associates with. Furthermore, the techniques may decrease the power consumption of the STA while scanning, selecting and switching between one or more RATs.

Several aspects of wireless communications systems in which techniques for intelligent connectivity switching mechanism conditions are used will now be presented with reference to various apparatuses, methods, and computer-readable medium. These apparatuses, methods, and computer-readable medium will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software may depend upon the particular application and design constraints imposed on the overall system. In some implementations, any of these elements may refer to one of the parts that make up a system and may be divided into other elements.

Figure 4:
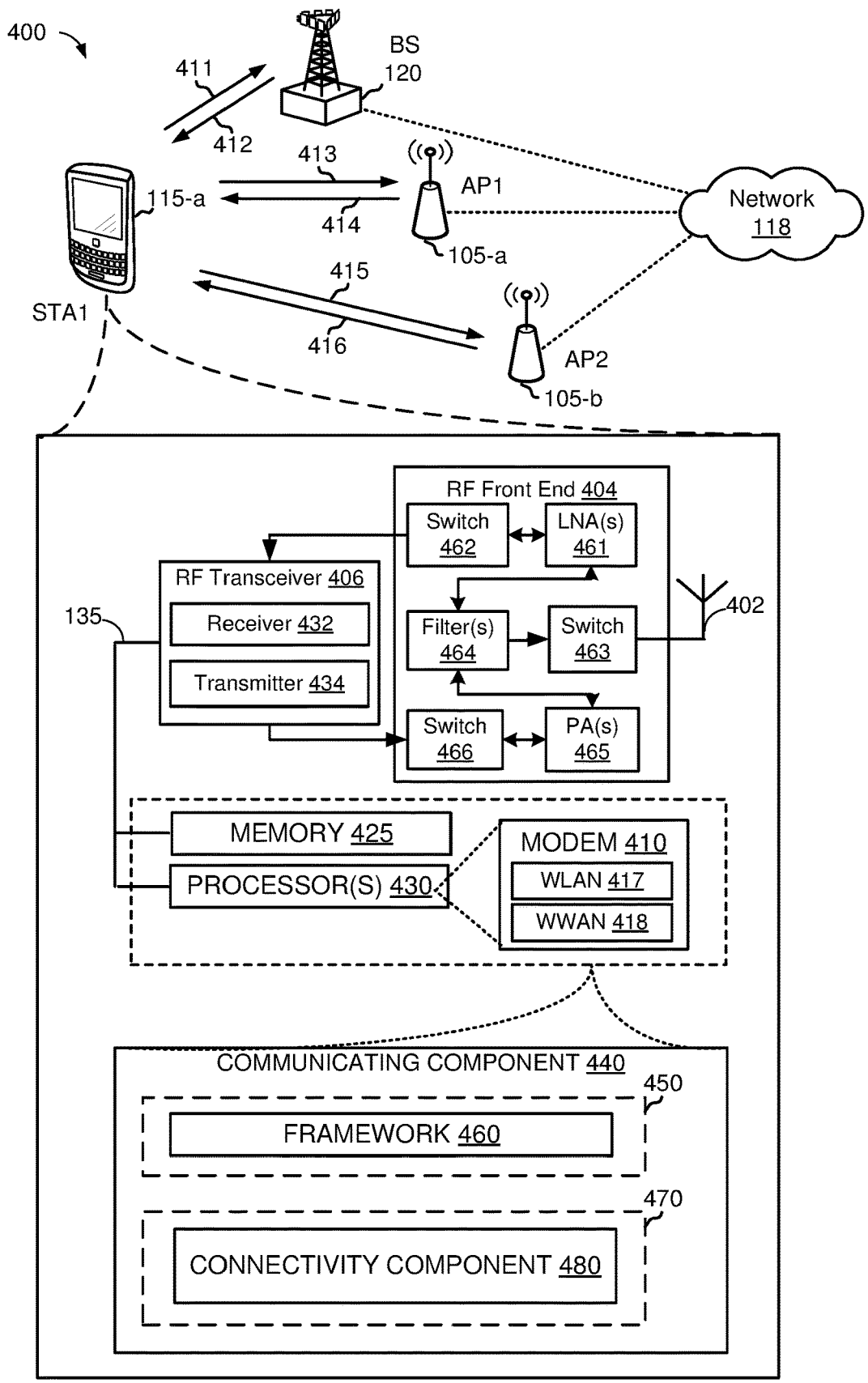
FIG. 4 shows a schematic diagram illustrating features of a wireless station in a wireless communication system.

By way of example, an element, or any portion of an element, or any combination of elements may be implemented with a "processing system" that includes one or more processors (such as, for example, FIG. 4). Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on, transmitted, or encoded as one or more instructions or code on a computer-readable medium (such as a non-transitory medium). The processes of a method or algorithm disclosed herein may be implemented in a processor-executable software module which may reside on a computer-readable medium. Computer-readable media includes both computer storage media and communication media including any medium that can be enabled to transfer a computer program from one place to another. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Accordingly, in some aspects, the methods, apparatuses, and computer-readable medium described in the present disclosure may provide an efficient solution, as compared to current solutions, for intelligent connectivity switching mechanisms or similar conditions in order to maintain an appropriate level of user experience (such as seamless wireless connectivity) while minimizing or reducing the cost of the services that enable such user experience.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

FIG. 1 shows a conceptual diagram illustrating an example of a wireless local area network (WLAN) deployment and a wireless wide area network (WWAN) deployment in connection with techniques for intelligent connectivity switching mechanisms. The WLAN deployment may include one or more access points (APs) and one or more wireless stations (STAs) associated with a respective AP. For example, the WLAN deployment can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be).

Also illustrated in FIG. 1 is at least a portion of a WWAN deployment (such as cellular network deployment) that may include one or more base stations (BSs, eNodeBs, or eNBs). The wireless communications system 100 may therefore support multiple radio access technologies (RATs). In some implementations of the wireless communications system 100, WLAN technology may be a first supported RAT and WWAN technology may be a second supported RAT. In some other implementations of the wireless communications system 100, WWAN technology may be a first supported RAT and WLAN technology may be a second supported RAT. Accordingly, one or more of the STAs shown in FIG. 1 may be hybrid devices that can perform wireless communications with the WLAN deployment via WLAN network devices (such as Wi-Fi APs), with the WWAN deployment via WWAN network devices (such as cellular BSs), or with both deployments.

In the example of FIG. 1, two APs 105 are depicted in the WLAN deployment for illustrative purposes: AP1 105-*a* in basic service set 1 (BSS1) and AP2 105-*b* in BSS2. AP1

105-*a* is shown having at least two associated STAs 115 (STA1 115-*a* and STA2 115-*b*) and coverage area 110-*a*, whereas AP2 105-*b* is shown having at least two associated STAs 115 (STA1 115-*a* and STA3 115-*c*) and coverage area 110-*b*. The coverage area of AP1 105-*a* overlaps part of the coverage area of AP2 105-*b* such that STA1 115-*a* is within the overlapping portion of both coverage areas. The number of BSSs, APs, and STAs, and the coverage areas of the APs described in connection with the WLAN deployment of FIG. 1 are provided by way of illustration and not of limitation.

The APs 105 (such as the AP1 105-*a* and the AP2 105-*b*) shown in FIG. 1 are generally fixed terminals that provide data services to STAs within its coverage area or region. In some implementations, one or more of the APs 105 may be a mobile or non-fixed terminal. The STAs 115 (such as STA1 115-*a*, STA2 115-*b* and STA3 115-*c*) shown in FIG. 1, which may be fixed, non-fixed, or mobile terminals, utilize the data services of their respective AP to connect to a network, such as the Internet (for example the network 118). Examples of an STA 115 include, but are not limited to wireless device, mobile devices, a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), or any other suitable wireless apparatus requiring the data and backhaul services of an AP. An STA 115 also may be referred to by those skilled in the art as: a subscriber station, a mobile unit, a subscriber unit, a wireless unit, a remote unit, a wireless communications device, a remote device, a mobile subscriber station, an access terminal, a mobile terminal, a wireless station, a remote terminal, a handset, a user agent, a mobile client, a client, user equipment (UE), or some other suitable terminology. An AP 105 also may be referred to as: a BS, a base transceiver station, a radio base station, a radio transceiver, a transceiver function, a small cell, or any other suitable terminology. The various concepts described throughout this disclosure are intended to apply to all suitable wireless apparatus regardless of their specific nomenclature.

Each of STA1 115-*a*, STA2 115-*b*, and STA3 115-*c* may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each of AP1 105-*a* and AP2 105-*b* can include software applications or circuitry to enable associated STAs 115 to connect to a network via communications links 125. The APs 105 can send frames, packets, data units, or similarly structured communications to their respective STAs 115, and receive frames, packets, data units, or similarly structured communications from their respective STAs 115, to communicate data or control information (such as signaling).

Each of AP1 105-*a* and AP2 105-*b* can establish a communications link 125 with an STA 115 that is within the coverage area of the AP 105 to perform wireless communications with the STA 115. Communications links 125 can include communications channels that can enable both uplink (UL) and downlink (DL) communications. An established exchange using a communications link 125 may be referred to as a wireless connection or simply a connection. When connecting to an AP 105, a STA 115 can first authenticate itself with the AP 105 and then associate itself with the AP 105. Once associated, a communications link 125 can be established between the AP 105 and the STA 115 such that the AP 105 and the associated STA 115 can exchange frames, messages, packets, or the like through a direct communications channel.

In the example of FIG. 1, there is a base station (BS) 120 in the WWAN deployment (such as cellular network deployment) for illustrative purposes. BS 120 may be referred to as a NodeB, eNodeB, Home NodeB, a Home eNodeB, or some other suitable terminology.

The coverage area 112 of the BS 120 may be divided into sectors. The coverage area 112 may typically be larger than the coverage areas 110-*a* and 110-*b* associated with the AP1 105-*a* and the AP2 105-*b*, respectively. In some implementations, the AP1 105-*a* and the AP2 105-*b* may be referred to as small cells and the BS 120 may be referred to as a macro cell based at least in part on their respective coverage areas. Moreover, the coverage area of the BS 120 overlaps part of the coverage areas of the AP1 105-*a* and the AP2 105-*b* such that the STA1 115-*a* is within the overlapping portion of the coverage areas. When the STA1 115-*a* is a hybrid device, it may be configured to perform wireless communications with one or more of the BS 120, AP1 105-*a*, or AP2 105-*b*. As noted above, wireless communications may involve particular or specific communications associated with the operations of an application, task or transaction, such as a user-level application or end-user program in the STA1 115-*a*. As described in more detail below, to maintain seamless connectivity, handle data stall conditions, and minimize operational costs to the user, the wireless communications associated with the applications, tasks or transactions may be switched between Wi-Fi network connectivity (such as connectivity via the AP1 105-*a* or the AP2 105-*b*) and cellular network connectivity (such as connectivity via the BS 120).

As described herein, the STA1 115-*a* may be configured to switch between Wi-Fi network connectivity and cellular network connectivity in connection with one or more intelligent connectivity switching mechanisms. For example, the STA1 115-*a* may perform a switch from communicating with one of the AP1 105-*a* or the AP2 105-*b* to communicating with BS 120 or subsequently perform an intelligent connectivity switch from communicating with BS 120 to communication with one of the AP1 105-*a* or the AP2 105-*b*. When switching from providing network connectivity using one RAT to providing network connectivity using another RAT, the STA1 115-*a* may use different modems. For example, switching the wireless communications may involve switching communications between a first modem (such as a Wi-Fi modem or Wi-Fi portion of a modem) and a second modem (such as a cellular modem or cellular portion of a modem).

The STA1 115-*a* may be configured to communicate with the BS 120 using communications links 125. The communications links 125 between STA1 115-*a* and AP1 105-*a* or AP2 105-*b* may utilize protocols associated with a first RAT (such as Wi-Fi technology), whereas communications links 125 between STA1 115-*a* and BS 120 may utilize protocols associated with a second RAT (such as cellular technology, like long term evolution (LTE), 4G or 5G NR). That is, the physical link(s) associated with communications links 125 between the STA1 115-*a* and the AP1 105-*a* or AP2 105-*b* may have different characteristics, properties, and structure than the physical link(s) associated with communications links 125 between the STA1 115-*a* and BS 120.

The core network 130, and correspondingly the network 118, may communicate with BS 120 or with the APs 105 via one or more backhaul links 132 (such as an S1 interface, etc.). The BS 120 or APs 105 also may communicate with one another, such as directly or indirectly via backhaul links (not shown) (such as an X2 interface, etc.) or via backhaul links 132 (such as through core network 130).

The wireless communications system 100 may support synchronous or asynchronous operation with the BS 120 or APs 105. Moreover, the wireless communications system 100 may operate according to frequency division duplexing (FDD) or time division duplexing (TDD). For the WWAN deployment, when an LTE, 4G or 5G NR network is being used, orthogonal frequency-division multiple access (OFDMA) communications signals may be used in the communications links 125 between the BS 120 and the STA1 115-*a* for LTE, 4G or 5G NR downlink transmissions for each hierarchical layer, whereas single carrier frequency division multiple access (SC-FDMA) communications signals may be used in the communications links 125 between the BS 120 and STA1 115-*a* for LTE, 4G or 5G NR uplink transmissions.

In some implementations, one or more STAs 115 in the wireless communications system 100 may be configured to mitigate data stall or similar conditions by utilizing one or more intelligent connectivity switching mechanisms. For example, upon detecting where wireless connectivity between two or more RATs is present in an overlapping coverage area, the STA1 115-*a*, may be configured to mitigate data stall conditions by performing an intelligent connectivity switching mechanism from a first RAT, such as the cellular BS 120, to a second RAT, such as the Wi-Fi AP1 105-*a*, or vice versa. By switching to a different RAT, the STA1 115-*a* may avoid disruption of connectivity, or may avoid or overcome the low data rates or high packet error rate (PER) conditions associated with a potential data stall. In implementations where the STA1 115-*a* is connected to a first RAT, such as the cellular BS 120, before activating one or more intelligent connectivity switching mechanism (or RAT switching mechanisms), the STA1 115-*a* can be configured to determine that the wireless connectivity with the second RAT, such as the Wi-Fi AP 105-*a*, is encrypted. Determining that wireless connectivity with the second RAT is encrypted can include determining if the second wireless connection with the Wi-Fi AP 105-*a* is a Hypertext Transfer Protocol Secure (HTTPS) connection or the Service Set Identifier (SSID) is encrypted.

In some implementations, the RAT switching mechanism can include presenting a user interface prompt at the STA1 115-*a*. The user interface prompt can indicate that the STA1 115-*a* is in an overlapping coverage area, and the prompt can present various options. The options can include maintaining connectivity with the first RAT, switching connectivity to the second RAT, dismissing an opportunity (i.e., dismiss or dismissal) to switch connectivity to the second RAT, and deferring the opportunity (i.e., snoozing or deferment) to switch connectivity to the second RAT for a period of time. In some implementations, the user interface prompt can be selected manually by a user.

In some implementations, the RAT switching mechanism can include evaluating one or more signal-to-noise (SNR)-related metrics of the first RAT, the second RAT, or both RATs. The one or more SNR-related metrics, can include an SNR value, a reference signal received power (RSRP) value, a reference signal received quality (RSRQ) value, and a signal-to-interference-plus-noise ratio (SINR) value. The STA1 115-*a* can be configured to evaluate the metrics, compare the metrics to a lookup table or database, and determine if the metrics exceed or fall below particular SNR-related metric threshold. Depending on whether the SNR-related metric exceeds or falls below the particular threshold, the STA1 115-*a* can be implemented to establish or maintain connectivity with the first RAT, or switch and establish connectivity with the second RAT. In some implementations, the SNR-related metric thresholds can be user defined, or user configured, such as populated in the lookup table or database.

In some implementations, the STA1 115-*a* may be configured to determine, such as from information available at one or more Wi-Fi drivers/firmware in the STA1 115-*a*, whether to switch existing wireless communications from the AP1 105-*a* to the BS 120 to overcome a weak link, i.e., a communication link indicating one or more low SNR-related metric values, with the AP1 105-*a*. When the weak link is detected, the STA1 115-*a* may disconnect from AP1 105-*a*, which may enable a framework (such as the framework 460 depicted and described in FIGS. 5 and 6) operating on the STA1 115-*a* to switch existing wireless communications to the BS 120.

As a corollary, the STA1 115-*a* may be configured to switch the wireless communications back to the Wi-Fi AP 105-*a* from the cellular BS 120, in response to detecting or determining that the link quality of the Wi-Fi network (such as link to AP1 105-*a* or AP2 105-*b*) has improved or satisfies certain metrics, such as meeting a particular SNR-related metric threshold. For example, the STA1 115-*a* may be configured to monitor, after switching the wireless communications to the BS 120, Wi-Fi link characteristics and Wi-Fi driver/firmware information. In some implementations, the STA1 115-*a* may disassociate (such as disconnect) from the AP1 105-*a* (and connect to BS 120) until the link quality of either the AP1 105-*a* or AP2 105-*b* is appropriate to handle the wireless communications. This approach may avoid having the STA1 115-*a* perform a scan and prematurely rejoin the AP1 105-*a* when the link quality with the AP1 105-*a* has not improved to the point that is suitable for the wireless communications. The switching of the wireless communications back to a Wi-Fi AP may be determined, at least in part, by the framework operating on the STA1 115-*a*.

A framework may refer to an entity operating on the STA1 115-*a* that is configured to monitor Wi-Fi network connectivity and determine whether to use Wi-Fi or cellular network connectivity for wireless communications. An entity as described herein may refer to an element of a program, software, or firmware that is structurally and functionally distinct from other elements and that is separately referenced. An entity may be configured as part of a particular layer, where a layer may refer to one of multiple functional elements that interact in some sequential and hierarchical way, and where each layer usually has a specified interface to communicate with an adjacent layer in the sequence or hierarchy. In some implementations, an entity, or a layer associated with the entity, may be implemented in hardware separate from hardware associated with other related entities, or other related layers. As such, each entity or layer may be implemented as a separate hardware component or a separate means for performing the functions associated with the entity or layer.

In some implementations, the RAT switching mechanism can involve the STA1 115-*a* comparing an application, task or transaction, which is active at the STA1 115-*a*, to a whitelist. The whitelist may be statically or dynamically defined, and may be stored in memory (such as the memory 425 depicted and described in FIG. 4). If the application, task or transaction is included in the whitelist, the STA1 115-*a* may maintain wireless connection with the first RAT. Conversely, fi the application, task or transaction is not included in the whitelist, the STA1 115-*a* may switch its wireless connection to the second RAT.

In some implementations, after the STA1 115-*a* performs a RAT switching mechanism and moves the wireless communications from the AP1 105-*a* to the BS 120 so as to provide an appropriate level of user experience on the STA1 115-*a*, the STA1 115-*a* may then monitor one or more network devices (such as the AP1 105-*a* or the AP2 105-*b*) in anticipation of a move back to a Wi-Fi network as early as possible so as to avoid the higher operational costs of having to access a network (such as Internet) using cellular network connectivity. The STA1 115-*a* also may filter results from the monitoring (such as filtering scan reports) based at least in part on one or more threshold SNR-related metric values stored in the STA1 115-*a*. In some other implementations, the STA1 115-*a* may identify, based on the filtered results, one or more network devices (such as the APs 105) being monitored as suitable for the wireless communications. For example, the STA1 115-*a* may identify the original or initial Wi-Fi access point (such as the AP1 105-*a*) or another Wi-Fi access point (such as the AP2 105-*b*) as suitable to handle the wireless communications. When a suitable AP 105 is identified, in some implementations, the STA1 115-*a* may switch the wireless communications from the BS 120 back to the AP1 105-*a* or to the AP2 105-*b*. When multiple APs 105 are suitable, the STA1 115-*a* may be configured to select or identify the one that has the better link characteristics (such as lowest SNR-related metrics, highest data rates, or lowest PER values). The framework operating on the STA1 115-*a* may be configured to perform operations or provide instructions to cause the switching to the most suitable of the APs 105.

While aspects of the present disclosure are described in connection with a WLAN deployment or the use of IEEE 802.11-compliant networks, those skilled in the art will readily appreciate, the various aspects described throughout this disclosure may be extended to other networks employing various standards or protocols including, by way of example, personal area networks (PAN), Bluetooth and Bluetooth Low Energy networks, and other technologies used in WWANs, WLANs, or other suitable networks now known or later developed. Thus, the various aspects presented throughout this disclosure for intelligent connectivity switching mechanisms (or RAT switching mechanisms) may be applicable to any suitable wireless network regardless of the coverage range and the wireless access protocols utilized.

Figure 2A:
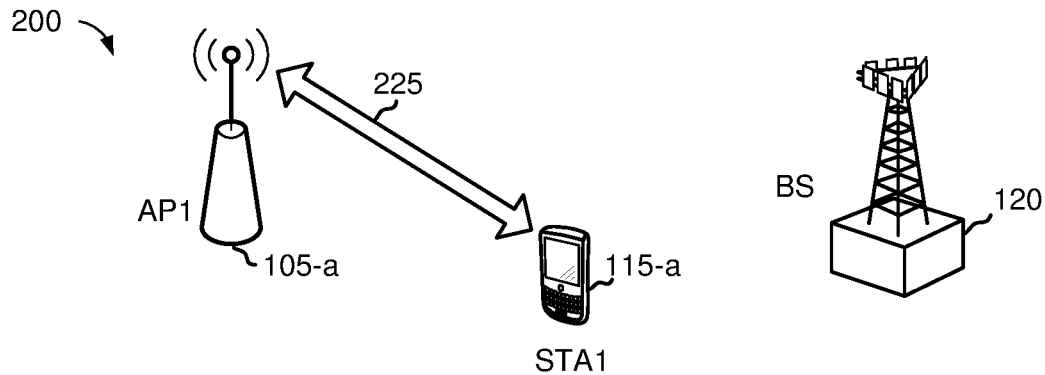
FIGS. 2A-2C show schematic diagrams illustrating switching between a WLAN and a WWAN.

FIG. 2A shows a schematic diagram 200 illustrating switching between a WLAN and a WWAN. The diagram 200 presents wireless communications 225 taking place between a STA1 115-*a* and an AP1 105-*a* (such as the STA1 115-*a* and the AP1 105-*a* depicted and described in FIG. 1). The wireless communications 225 may occur over, for example, one or more communications links 125 as described with respect to FIG. 1. In some implementations, the wireless communications 225 may take place over a connection or channel established using the communications links 125. The wireless communications 225 may correspond to the exchange of data or control information associated with one or more applications, tasks or transactions operating on the STA1 115-*a*. In an example of such applications, multimedia applications may operate on the STA1 115-*a* to stream movies or other multimedia content from the Internet via AP1 105-*a*. In some implementations, the Internet may be accessed using the network 118 as described with respect to FIG. 1.

In some instances, STA1 115-*a* may be close to the AP1 105-*a* and the quality of the link between the STA1 115-*a* and AP1 105-*a* may be good or sufficient to access a network for wireless communications 225 so that the user of STA1 115-*a* has a good experience. In some other instances, the STA1 115-*a* may move away from the AP1 105-*a* but remain within the coverage area of the AP1 105-*a* (such as coverage area 110-*a* in FIG. 1). As the STA1 105-*a* moves closer to the edge of the coverage area of the AP1 105-*a*, the quality of the communication link between the STA1 115-*a* and the AP1 105-*a* may deteriorate. The deterioration of the communication link may adversely affect data rates or increase packet error rate (PER) instances, resulting or likely to result in a negative user experience at the STA1 115-*a*. In such instances, the STA1 115-*a* may employ one or more intelligent connectivity switching mechanisms in making a determination to switch or move the wireless communications 225 to the BS 120 (see FIG. 2B) to continue to access the network (such as the Internet) in a manner that makes the experience acceptable to the user (such as without noticeable disruptions in the exchange of data).

That is, utilizing one or more of the RAT switching mechanisms, the STA1 115-*a* may switch connectivity from Wi-Fi network connectivity to cellular network connectivity in a seamless manner. In some implementations, the STA1 115-*a* may respond to a user interface prompt indicating that the STA is in an area where Wi-Fi network connectivity overlaps with cellular network connectivity. In response to the user interface prompts, the STA1 115-*a* may select to stay with the Wi-Fi network, switch to the cellular network, dismiss an opportunity to switch to the cellular network, or defer an opportunity to switch to the cellular network for a period of time, i.e., such as to all the STA1 115-*a* to complete an action in an active application, task or transaction. A person having ordinary skill in the art will readily recognize that if the STA1 115-*a* was initially connected to the cellular network, the user interface prompts may give the STA1 115-*a* the option to switch to the Wi-Fi network, as well as dismissing or snoozing the opportunity to switch to the Wi-Fi network.

In some other implementations of the RAT switching mechanisms, the STA1 115-*a* may evaluate one or more SNR-related metrics in relation to one or more SNR-related metric thresholds before selecting between staying connected with the Wi-Fi network versus connecting with the cellular network. That is, the STA1 115-*a* may monitor and receive information, such as an SNR value, a reference signal received power (RSRP) value, a reference signal received quality (RSRQ) value, a signal-to-interference-plus-noise ratio (SINR) value, in addition to monitoring and receiving uplink (UL) quality metrics, downlink (DL) quality metrics, or congestion metrics. The STA1 115-*a* may compare the monitored and received information to one or more thresholds in a lookup table or database before determining which network will provide better connectivity services. For example, if the STA1 115-*a* determines that the information exceeds a particular threshold, the STA1 115-*a* can be implemented to maintain the wireless connection with the particular RAT. Conversely, if the STA1 115-*a* determines that the information falls below a particular threshold, the STA1 115-*a* can be implemented to switch connectivity to a different RAT (such as to the BS 120, or to another AP, such as the AP2 105-*b*). By following this RAT switching mechanism approach, the STA1 115-*a* can switch to a better connection before its current connection is dropped or lost.

In yet some other implementations of the RAT switching mechanisms, upon entering an area having overlapping wireless connectivity coverage zones from an AP and a BS, the STA1 115-*a* can be configured to compare an application, task or transaction that is in use on the STA1 115-*a* to a whitelist. Applications, tasks or transactions that are whitelisted may be deemed critical applications, tasks and transactions and the STA1 115-*a* may be configured to stay with the currently connected RAT instead of switching connectivity to another RAT so as to avoid connectivity disruption.

Figure 2B:
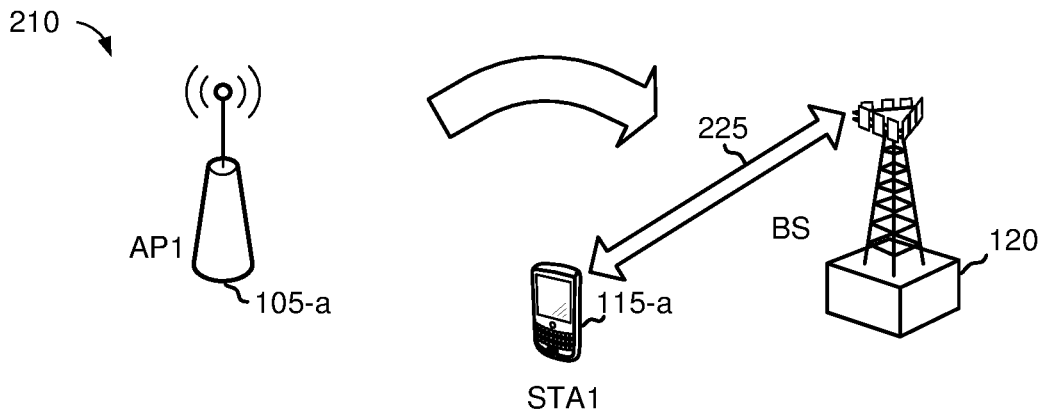

FIG. 2B shows another schematic diagram 210 illustrating switching between a WLAN and a WWAN. The diagram 210 presents employing an intelligent connectivity switching mechanism to switch wireless communications 225 from the AP1 105-*a* to the BS 120. As noted above, conventional Wi-Fi modems may be generally configured to remain connected and associated with a Wi-Fi AP as much as possible. Maintaining connectivity with a Wi-Fi AP (or a cellular BS) when the STA1 115-*a* is at the edge of a coverage area may result in data stall condition. As such, the STA1 115-*a* may be configured to perform an switch from Wi-Fi network connectivity (such as Wi-Fi network services) to cellular network connectivity (such as cellular network services) as described above, or vice versa. In some implementations, the STA1 115-*a* may include a modem such as a Wi-Fi modem (such as the modem 410 in FIG. 4) configured to switch the wireless communications 225 from the AP1 105-*a* to the BS 120. The modem may be configured to take into account, when determining whether to switch away from Wi-Fi network connectivity to cellular network connectivity, one or more SNR-related metrics, or one or more UL quality metrics, DL quality metrics, or congestion metrics, etc. Congestion, or network congestion, may refer to the subset or fraction of airtime during which the STA1 115-*a* is granted use of the Wi-Fi medium (such as for DL and UL communications) relative to other wireless stations (such as the STA2 115-*b*) that are also connected to the AP1 105-*a*. Information about UL quality metrics, DL quality metrics, or congestion metrics may be identified, obtained, or determined by the STA1 115-*a* based on information received from the AP1 105-*a* or from measurements performed by the STA1 115-*a*.

In some implementations, the STA1 115-*a* may include a Wi-Fi modem and a cellular modem, or a single modem having both a Wi-Fi portion and a cellular portion (such as the modem 410 in FIG. 4 having a WLAN or Wi-Fi portion 417 and a WWAN or cellular portion 418). The STA1 115-*a* may be configured to implement a RAT switching mechanism and then switch wireless communications 225 as shown in FIG. 2B by having the cellular modem handle the wireless communications 225 instead of the Wi-Fi modem, or by having the cellular portion of the single modem handle the wireless communications 225 instead of the Wi-Fi portion of the single modem, as depicted in FIG. 2A.

In some implementations, the STA1 115-*a* may compare one or more SNR-related metrics, or one or more of UL quality metrics, DL quality metrics, or congestion metrics to respective threshold values (such as the thresholds 493 depicted and described in FIG. 5 and FIG. 6) to determine whether to perform an intelligent connectivity switching mechanism to mitigate the potential for data stall or similar disruptive connectivity conditions. For example, a set of SNR-related metrics, including a UL quality metric, a DL quality metric, or a congestion metric may be evaluated by comparing each of these metrics to a respective threshold value (such as the thresholds 493). Which metrics are included in the set of metrics may be dynamically determined or adjusted by a framework, such as the framework 460 depicted and described in FIG. 4. Moreover, the set of metrics used for the AP1 105-*a* may be different from a set of metrics used for another AP 105. As shown in FIG. 2B, in response to determining that the respective threshold values are not satisfied, the STA1 115-*a* may disconnect from the AP1 105-*a* and switch the wireless communications 225 from the AP1 105-*a* to the BS 120. In other words, when the respective threshold value are not satisfied and the AP1 105-*a* is identified as not suitable for handling the wireless communications 225, a switch from the AP1 105-*a* to the BS 120 (i.e., from Wi-Fi network connectivity to cellular network connectivity) may be triggered at the STA1 115-*a*. In some implementations, a metric or a set of metrics not satisfying respective threshold values may refer to the metric or set of metrics not meeting a certain level of performance that would otherwise be considered sufficient for that metric or set of metrics. On the other hand, a metric or a set of metrics satisfying respective threshold values may refer to the metric or set of metrics meeting or exceeding a certain level of performance that would be considered sufficient for that metric or set of metrics.

In some implementations, in response to determining that the respective threshold values are not satisfied, the STA1 115-*a* may determine to maintain a connection with the AP1 105-*a* while also switching the wireless communications 225 from the AP1 105-*a* to the BS 120. In such an implementation, the STA1 115-*a* may be configured to perform two separate determinations. For example, the STA1 115-*a* may use a set of metrics and respective threshold values to determine to switch the wireless communications 225 from the AP1 105-*a* to the BS 120. The STA1 115-*a* may use the same set of metrics with different respective thresholds values, or a different set of metrics with respective threshold values, to determine whether to maintain a connection with the AP1 105-*a*. That is, the STA1 115-*a* may determine that the quality of the link with the AP1 105-*a* does not provide the desired user experience and may switch the wireless communications 225 to the BS 120, however, the quality of the link with the AP1 105-*a* may be sufficient to easily track the performance of the AP1 105-*a* so that the STA1 115-*a* may quickly switch back to the AP1 105-*a* to avoid the higher operational costs associated with the BS 120 and also avoid scanning operations that may delay the return to Wi-Fi connectivity. In other words, the wireless communications 225 may be switched to the BS 120 when the metrics used in making that determination do not satisfy certain performance criteria, whereas a connection with the AP1 105-*a* may be maintained when metrics used in making that determination satisfy certain performance criteria. A person having ordinary skill in the art will readily recognize that this situation is applicable in reverse, i.e., where the STA1 115-*a* is connected to the BS 120 but determines that the quality of the link with the BS 120 is less than desirable, and initiates one or more RAT switching mechanisms to switch the wireless communications 225 to the ATP1 105-*a*.

Figure 5:
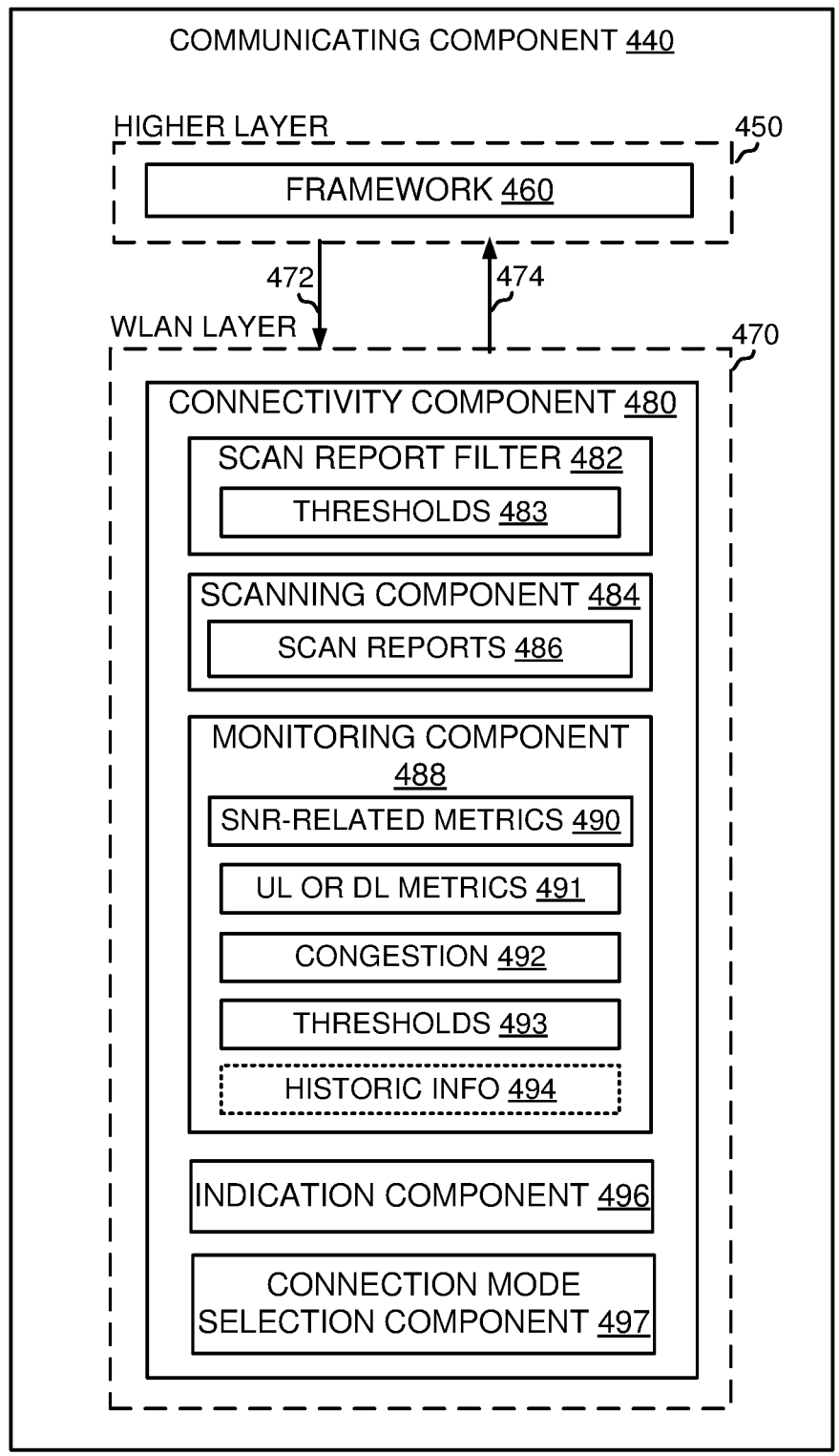
FIGS. 5 and 6 show block diagrams illustrating details of a communicating component in a wireless station for implementing intelligent connectivity switching mechanisms.
Figure 6:
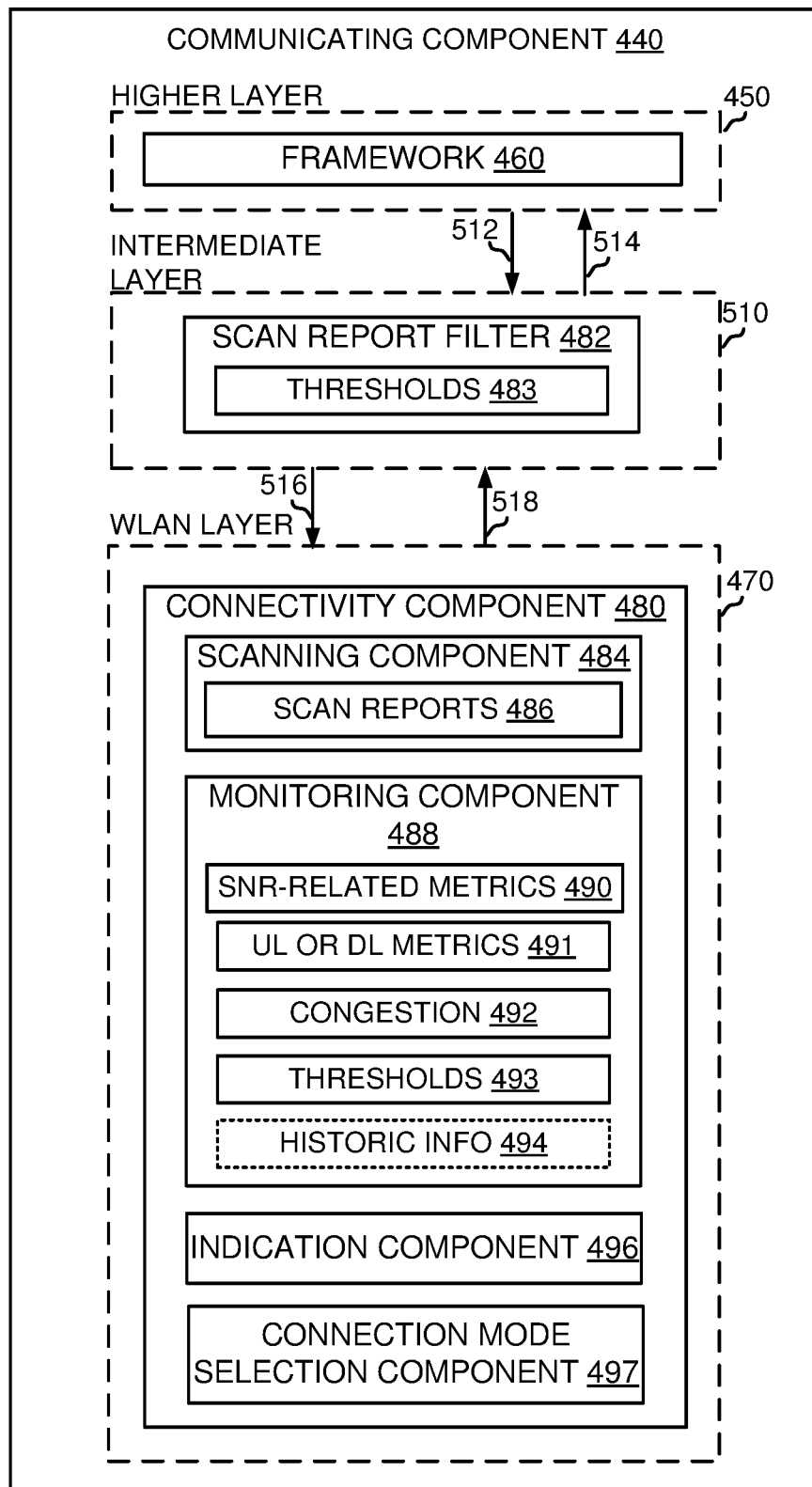

In some implementations, the values of the metrics in the set or sets of metrics and their respective threshold values may be based on information stored in Wi-Fi drivers/firmware (such as the SNR-related metrics 490, UL or DL metrics 491, congestion metrics 492, or historic information (info) 494 depicted and described in FIGS. 5 and 6). In the example shown in FIG. 2B, a determination is made that a connection to the AP1 105-*a* is not to be maintained and, consequently, the STA1 115-*a* disconnects from the AP1 105-*a* as part of RAT switching mechanism which changes the wireless communications 225 to the BS 120.

In some other implementations, the threshold values used by the STA1 115-*a* may be determined based on a desired user experience and user preference. For example, when a user wants to have a particularly successful experience streaming video content, the STA1 115-*a* may monitor one or more SNR-related metrics, UL quality metrics, or one or more DL quality metrics that enable the appropriate application, task or transaction rate (such as sustaining a minimum of 3 Mbps, or 5 Mbps, or 10 Mbps, etc.). This monitored information may be used by the STA1 115-*a*, along with the current contention or congestion information (such as congestion metrics), to identify a corresponding modulation and coding scheme (MCS) that needs to be supported to provide the desired user experience. In such instances, if the MCS that is identified cannot be maintained (such as the link quality is not sufficient or suitable for wireless communications 225), then the STA1 115-*a* may employ a RAT switching mechanism before determining to switch the wireless communications 225 to the BS 120.

The DL quality metrics being monitored or considered by the STA1 115-*a* may include, for example, at least one or more of an MCS used by an AP 105 (such as the AP1 105-*a*) in downlink transmissions, a PER experienced in connection with downlink transmissions, a number of retransmissions from an AP (such as captured lost Block Acknowledgements (BAs)) based on retransmitted sequence number, a received signal strength indication (RSSI) from a beacon sent by an AP, an RSSI for downlink data transmissions, a beacon loss rate, a loss of control frames (such as request-to-sent/clear-to-send (RTS/CTS) not followed by data can be representative of lost CTS), or similar metrics.

An example of a DL quality metric may be metrics associated with DL transmissions from an AP at MCSO and based on sequence number. In such an example, when PER is considered, a threshold value of 50% (such as PER >50%) may be used. In such an example, when the number of retransmissions from the AP is considered, a threshold value of 10 (such as greater than 10) retransmission from the AP may be used.

The UL quality metrics being monitored or considered by the STA1 115-*a* may include, for example, at least one or more of an MCS used by the STA1 115-*a* for uplink transmissions, a PER experienced in connection with uplink transmissions, a number of transmissions for which BAs are not properly received (such as number of consecutive BAs failures), a loss of control frames (such as RTS for which CTS is not received, BA request (BAR) for which BA is not received), a packet drop rate (such as a number of aggregated MAC protocol data units (AMPDUs) dropped), or similar metrics.

An example of an UL quality metric may be metrics associated with UL data transmission at MCSO (or lowest MCS). In such an example, when PER is considered, a threshold value of 50% (such as PER >50%) may be used. In such an example, when the number of consecutive transmission failures is considered, a threshold value of 10 (such as greater than 10) consecutive transmission failures may be used.

The congestion metrics being monitored or considered by the STA1 115-*a* may include, for example, at least one or more of a channel access latency measured by the STA1 115-*a*, an indication that the medium is busy (such as clear channel assessment (CCA) is high), a number of neighboring access points (such as whether a large number is present), a duration of transmissions from other STAs 115 (such as long duration, short interframe space (SIFS) bursting), or similar metrics.

An example of congestion metric may be a UL channel access latency. In such an example, a threshold value of 200 ms (such as latency >200 ms) may be used.

These examples of UL quality metrics, DL quality metrics, and congestion metrics are provided by way of illustration and not of limitation. Not only can different metrics be considered together, but the combination of metrics being considered may change dynamically during operation. Moreover, different threshold values may be also used (such as different default thresholds, threshold dynamically adjusted during operation).

In some implementations, one or more of the threshold values (such as the thresholds 483 and 493 depicted and described in FIGS. 5 and 6) can be changed or modified dynamically by a framework in a higher layer of the STA1 115-*a* (such as the framework 460 depicted and described in FIGS. 4-6). The threshold values can be changed or modified based on contextual information (such as applications running, service set identifier (SSID), etc.). For example, one or more of the threshold values can be changed or modified dynamically by a framework based at least in part on which application, task or transaction is being executed on the STA1 115-*a*. In another example, when connecting to public hotspots, the STA1 115-*a* may use more aggressive threshold values (such as the quality of the Wi-Fi link needs to be higher). In such an example, a threshold value may be dynamically changed such that better link quality metrics are needed, otherwise the STA1 115-*a* may initiate an early switch of away from Wi-Fi network connectivity to cellular network connectivity, or vice versa. The framework also may reset one or more threshold values to a default value in response to changes in the contextual information. For example, when moving away from the public hotspot and accessing a different Wi-Fi AP, the framework may revert back to less aggressive threshold values and may change or modify the threshold values to default values.

Figure 2C:
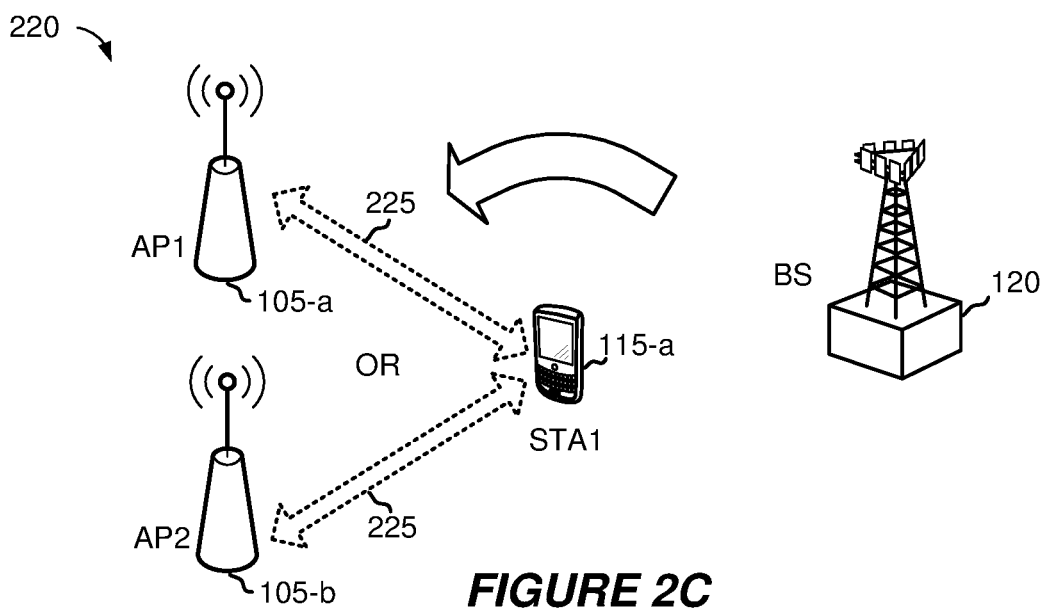

FIG. 2C shows a schematic diagram 220 illustrating switching between a WLAN and a WWAN. The diagram 220 presents employing an intelligent connectivity switching mechanism to switch the wireless communications 225 from the BS 120 back to the AP1 115-*a* or to the AP2 115-*b*. In some implementations, the STA1 115-*a* may desires to switch the wireless communications 225 back to Wi-Fi network connectivity to take advantage of the lower operational cost associated with Wi-Fi services. One issue to consider is that after the STA1 115-*a* has disassociated (such as disconnected) from the AP1 105-*a*, a conventional framework operating on the STA1 115-*a* may initiate scan or search operations to identify an available AP 105. Typically, such a framework, sometimes referred to as a basic framework, after detecting the beacon signal of an AP, may trigger or initiate an automatic association with that AP. In many cases, the beacon signal that would be detected as part of the scan or search operation is that of the AP from which the STA1 115-*a* just disassociated, which in this example is the AP1 105-*a*. However, the AP1 105-*a* is not likely to have had its link quality improved by the time is identified or detected as part of the scan operation.

Thus, to prevent oscillating between the AP1 105-*a* and the BS 120, in some implementations, the STA1 115-*a* is configured to prevent re-associating with the same AP 105 if the link quality of that AP 105 remains poor.

One approach that may be followed by the STA1 115-*a* is to monitor the RSSI of beacons received from various APs 105, including the AP 105 from which the STA1 115-*a* disassociated (such as the AP1 105-*a*). If the beacon RSSI has not improved since the last disassociation (such as the beacon RSSI has not improved to satisfy a threshold value or has not improved by a set amount), then the STA1 115-*a* will not associate with that AP 105. The STA1 115-*a* may consider associating with another AP 105 that would provide an appropriate level of performance.

Another approach is to actively send transmissions to APs 105 (such as the AP1 105-*a* and the AP2 105-*b*) to determine or identify one or more link quality metrics. For example, quality-of-service (QoS) null frames can be used by the STA1 115-*a* to measure uplink quality. In another aspect, the APs 105 may send downlink transmissions that may be used by the STA1 115-*a* to measure downlink activity. In some implementations, the STA1 115-*a* may send one or more requests, pings, or other similar messages to which the APs 105 respond and the STA1 115-*a* may use the response to measure or otherwise determine downlink activity.

The STA1 115-*a* may compare one or more of the SNR-related metrics, UL quality metrics, DL quality metrics, or congestion metrics to respective thresholds values (such as the thresholds 493 depicted and described in FIGS. 5 and 6) to determine whether to switch back to Wi-Fi network connectivity from the BS 120. In response to determining that the respective threshold values are satisfied, the STA1 115-*a* may disconnect from the BS 120 and switch the wireless communications 225 from the BS 120 back to the AP1 105-*a* or optionally to the AP2 105-*b* as shown in FIG. 2C. In some implementations, the results from comparing metrics to respective threshold values to determine whether to switch back to Wi-Fi network connectivity may be reported to a framework as part of a scan or search operation. In this regard, the STA1 115-*a* may be configured to identify in the scan report, and based on the results from the comparison results, which of the AP1 105-*a* and the AP2 105-*b* is available and suitable for handling the wireless communications 225. In an example, the STA1 105-*a* may modify a scan report to remove an AP that is not suitable or to identify (such as label, tag) an AP that is not suitable.

In another aspect, scan or search operations may indicate or list available APs 105 and thresholds (such as the thresholds 483 and 493 depicted and described in FIGS. 5 and 6) may be used to remove or identify those APs 105 that are not suitable for handling wireless communications 225.

The subset of SNR-related metrics, UL quality metrics, DL quality metrics, or congestion metrics considered when determining whether to switch back to Wi-Fi network connectivity may be the same or different from the subset of SNR-related metrics, UL quality metrics, DL quality metrics, or congestion metrics considered when determining whether to switch away from Wi-Fi network connectivity and to cellular network connectivity in the first place. Similarly, the respective threshold values considered when determining whether to switch back to Wi-Fi network connectivity may be the same or different from the respective threshold values considered when determining whether to switch away from Wi-Fi network connectivity and to cellular network connectivity in the first place.

In those instances in which the STA1 115-*a* continues to remain associated (such as connected) to the AP1 105-*a* and the framework operating on the STA1 115-*a* switches the wireless communications 225 from the AP1 105-*a* to the BS 120, the STA1 115-*a* may continue to monitor one or more of the SNR-related metrics, UL quality metrics or DL quality metrics (such as beacon RSSI, send active transmissions) of the AP1 105-*a* and may notify or indicate to the framework to switch from cellular network connectivity back to Wi-Fi network connectivity when it is determined that the link quality of the AP1 105-*a* has improved. In another aspect, the STA1 115-*a* may monitor or measure one or more congestion metrics to determine network congestion information and use this information, along with the SNR-related metrics, UL quality metrics and DL quality metrics, to determine whether to switch back to the AP1 105-*a* for Wi-Fi network connectivity.

FIG. 3 shows an example lookup table 300 where one or more SNR-related metrics may be stored. The SNR-related metrics in the lookup table 300 are for illustration purposes, and the lookup table 300 may contain fewer columns (i.e., less than that four SNR-related metrics listed) or additional columns (i.e., greater than the four SNR-related metrics listed), and the values of the SNR-related metrics may differ (i.e., some of the SNR-related metrics may be approximations or have different values associated with them). The lookup table 300 (which also may be implemented as or in a database) provides a number of potential scenarios a wireless station, such as the STA1 115-*a* depicted and described in FIGS. 1-2C, may encounter when determining whether to employ a RAT switching mechanism. As described above, the SNR-related metrics and the corresponding thresholds can be user defined, or user configured. In other words, the lookup table 300 can be statically defined by a user, and updated periodically. In some implementations, the user can designate different SNR-related metric thresholds in the lookup table 300 depending on the particular application, task or transaction. Thus, in some implementations, the user may define SNR-related metric thresholds differently, or in a different range, depending on the particular app being used on the STA1 115-*a*.

For example, in Scenario 1, the STA1 115-*a* may decide to maintain its wireless connection with the first RAT (such as the BS 120 depicted and described in FIGS. 1-2C) because the application that is active on the STA1 115-*a* is whitelisted. In Scenario 2, for example, since the SNR-related metrics (i.e., SNR, RSRP, RSRQ and SINR) are "excellent," the STA1 115-*a* may decide to maintain its wireless connection with the first RAT. In Scenario 2, the STA1 115-*a* may choose to snooze a RAT switching mechanism user prompt while the STA1 115-*a* is actively using an application, task or transaction. In Scenario 3, for example, since the SNR-related metrics are "good," the STA1 115-*a* may decide to maintain its wireless connection with the first RAT. In Scenario 3, the STA1 115-*a* may choose to snooze a RAT switching mechanism user prompt for approximately 300 seconds while the STA1 115-*a* is actively using an application, task or transaction, which will prevent the application, task or transaction from being disrupted due to a potential wireless connectivity association change. In Scenario 4, for example, since the SNR-related metrics indicate that the STA1 115-*a* is positioned "mid cell" in a cellular network coverage zone, the STA1 115-*a* may choose to snooze a RAT switching mechanism user prompt for approximately 60 seconds, thus allowing the STA1 115-*a* to complete the active application, task or transaction engaged in at the STA1 115-*a*. In Scenario 5, for example, since the SNR-related metrics indicate that the STA1 115-*a* is positioned at the "cell edge" in a cellular network coverage zone, the STA1 115-*a* may choose to snooze a RAT switching mechanism user prompt for approximately 10 seconds, thus providing the STA1 115-*a* a few seconds to see if connectivity improves, or allowing the STA1 115-*a* to move closer to the serving cell. In Scenario 6, for example, since the SNR-related metrics indicate that the STA1 115-*a* is positioned at the "cell edge" in a cellular network coverage zone, the STA1 115-*a* may choose to select a RAT switching mechanism user prompt and immediately connect to a second RAT (such as the AP 105-*a* depicted and described in FIGS. 1-2C).

FIG. 4 shows a schematic diagram 400 illustrating features of a wireless station in a wireless communication system. The wireless communication system may represent at least a portion of the wireless communications system 100 depicted and described in FIG. 1. The diagram 400 includes the STA1 115-*a*, the BS 120, the AP1 105-*a* and the AP2 105-*b* depicted and described in FIGS. 1-2C. Also illustrated is the network 118, which may be communicatively coupled to the BS 120, the AP1 105-*a* and the AP2 105-*b* through other network devices, including, in some cases, the core network 130 depicted and described in FIG. 1.

In some implementations, when the STA1 115-*a* communicates with BS 120, it may do so by transmitting uplink signals 411 or receiving downlink signals 412. Similarly, when the STA1 115-*a* communicates with the AP1 105-*a*, it may do so by transmitting uplink signals 413 or receiving downlink signals 414. Moreover, when the STA1 115-*a* communicates with the AP2 105-*b*, it may do so by transmitting uplink signals 415 or receiving downlink signals 416.

As described above with respect to FIGS. 1-2C, the STA1 115-*a* may be configured to perform an intelligent connectivity switching mechanism to switch from Wi-Fi network connectivity to cellular network connectivity, and vice versa. For example, the STA1 115-*a* may carry out wireless communications with the BS 120 using the uplink signals 411 or the downlink signals 412. Once the STA1 115-*a* determines that the quality of the connection with the BS 120 has deteriorated, the STA1 115-*a* may switch wireless communications to the AP1 105-*a* and may carry out wireless communications with the AP1 105-*a* using uplink signals 413 or downlink signals 414.

The STA1 115-*a* may include a memory 425, one or more processors 430 and a transceiver 406. The memory 425, the one or more processors 430, and the transceiver 406 may communicate internally via a bus 135. In some examples, the memory 425 and the one or more processors 430 may be part of the same hardware component (such as may be part of a same board, module, or integrated circuit). Alternatively, the memory 425 and the one or more processors 430 may be separate components that may act in conjunction with one another. In some aspects, the bus 135 may be a communication system that transfers data between multiple components and subcomponents of the STA1 115-*a*. In some examples, the one or more processors 430 may include any one or combination of modem processor, baseband processor, digital signal processor, or transmit processor. Additionally, or alternatively, the one or more processors 430 may include a communicating component 440 for carrying out one or more methods or procedures described herein. The communicating component 440 may include hardware, firmware, or software and may be configured to execute code or perform instructions stored in a memory (such as a computer-readable storage medium). In some implementations, the one or more processors 430 may include a modem 410, which may be configured to perform Wi-Fi or cellular operations. In some implementations, as shown in FIG. 4, the modem 410 may include a WLAN portion 417 configured to handle Wi-Fi modem operations and a WWAN portion 418 configured to handle cellular modem operations. In another example (not shown), the one or more processors 430 may include separate modems for WLAN (such as Wi-Fi network) operations and WWAN (such as cellular network) operations. In some implementations, the communicating component 440 may be implemented or included as part of the modem 410.

In some examples, the memory 425 may be configured for storing data used herein or local versions of applications or the communicating component 440 or one or more of its subcomponents being executed by the one or more processors 430. The memory 425 can include any type of computer-readable medium usable by a computer or a processor 430, such as random access memory (RAM), read only memory (ROM), tapes, magnetic discs, optical discs, volatile memory, non-volatile memory, and any combination thereof. In some implementations, for example, the memory 425 may be a computer-readable storage medium (such as a non-transitory medium) that stores computer-executable code. The computer-executable code may define one or more operations or functions of the communicating component 440 or one or more of its subcomponents, or data associated therewith. The computer-executable code may define these one or more operations or functions when the STA1 115-*a* is operating the one or more processors 430 to execute the communicating component 440 or one or more of its subcomponents to activate any of the intelligent connectivity switching mechanisms, i.e., RAT switching mechanisms, described herein.

In some examples, the transceiver 406 may include a transmitter 434 for transmitting one or more data and control signals to the AP1 105-*a*, AP2 105-*b*, or the BS 120 via one or more antenna(s) 402. The transceiver 406 also may include a receiver 432 for receiving one or more data and control signals from the AP1 105-*a*, AP2 105-*b*, or the BS 120 via the antenna(s) 402. The transceiver 406 may include hardware, firmware, or software and may be configured to execute code or perform instructions stored in a memory (such as a computer-readable storage medium). The transceiver 406 may be configured to perform one or more of the intelligent connectivity switching mechanisms described herein. For example, when a determination is made to switch wireless communications from Wi-Fi network connectivity to cellular network connectivity or from cellular network connectivity to Wi-Fi network connectivity, the transceiver 406 may be configured accordingly. Similarly, radio frequency (RF) front end 404 in the STA1 115-*a* may be configured according to the switching being performed. For example, one or more of switches 462, 463, and 466, filter(s) 464, low-noise amplifier(s) (LNA(s)) 461, or power amplifier(s) (PA(s)) 465, may be configured according to whether Wi-Fi network connectivity (such as wireless communications with the AP1 105-*a* or the AP2 105-*b*) or cellular network connectivity (such as wireless communications with the BS 120) is being used.

The communicating component 440 may include a framework 460 associated with a first layer 450 and a connectivity component 480 associated with a second layer 470, where the second layer 470 may be referred to as a WLAN layer. The first layer 450 may be considered a higher and separate layer than the second layer 470. A higher layer may refer to a layer that is operationally closer to or associated with an application (such as a gaming or video streaming application), task or transaction operating or executing on the STA1 115-*a*. The framework 460 may be configured to perform operations or provide instructions to switch the wireless communications (such as wireless communications 225)

associated with an application, task or transaction from, for example, an AP 105 (such as AP1 105-*a* or the AP2 105-*b*) to a base station (such as the BS 120), or back from, for example, a base station to an AP 105.

In some implementations, the framework 460 may be configured to receive an indication (such as a message) to change or switch wireless communications in response to conditions associated with a data stall. In some implementations, the framework 460 may receive an indication from the connectivity component 480 to change from WLAN connectivity (such as Wi-Fi network connectivity) to WWAN connectivity (such as cellular network connectivity) or back to WLAN connectivity from WWAN connectivity. For example, the framework 460 may receive a first type of indication from the connectivity component 480 to switch the wireless communications 225 from the AP1 105-*a* to the BS 120. In another example, the framework 460 may receive a second type of indication from the connectivity component 480 to switch the wireless communications 225 from the BS 120 to the AP1 105-*a* or to the AP2 105-*b*. In this example, the second type of indication may identify to which AP 105 is the wireless communications 225 to be switched.

In some implementations, the first type of indication may be provided by the connectivity component 480 in response to a determination by the connectivity component 480 that one or more metrics associated with a link, channel, or connection with the AP1 105-*a* do not meet or satisfy respective threshold values. Accordingly, the first type of indication can be provided so that the appropriate intelligent connectivity switching actions are taken into consideration to ensure that a certain user experience level is provided for an existing application, task or transaction operating on the STA1 115-*a*.

In some other implementations, the second type of indication may be provided by the connectivity component 480 in response to a determination that one of the AP1 105-*a* and the AP2 105-*b* is available and suitable to handle the wireless connections for the existing application, task or transaction. In those instances in which a connection was maintained with the AP1 105-*a* after switching to cellular network connectivity, the second type of indication may be part of a message reporting that metrics associated with the AP1 105-*a* are such that the AP1 105-*a* is now capable of handling the wireless communications for the existing application, task or transaction. In those instances, in which a connection with the AP1 105-*a* was not maintained after switching to cellular network connectivity, the second type of indication may be part of a scan report identifying which APs are available and suitable (such as meet or satisfy the appropriate threshold values). The scan report may be a modified or adjusted to identify which APs can be considered for a switch back to Wi-Fi network connectivity.

The connectivity component 480 may be configured to monitor aspects of Wi-Fi network connectivity, including monitoring different metrics. For example, the connectivity component 480 may be configured to monitor one or more SNR-related metrics, UL quality metrics, DL quality metrics, or congestion metrics as described above. Monitoring may refer to different operations that enable the connectivity component 480 to determine a current value for the metrics. In some implementations, monitoring may include operations such as detecting messages or signals, measuring or identifying characteristics of such messages or signals (such as SNR or RSSI), identifying information in the messages or signals, or generating messages or signals for transmission to receive responses from which to obtain metric information. Moreover, monitoring also may include storing, collecting, retrieving, or obtaining historical information (such as the historic info 494 depicted and described in FIGS. 5 and 6) associated with one or more of the SNR-related metrics, UL quality metrics, DL quality metrics, or congestion metrics, to use such information when determining whether to switch network connectivity or whether to maintain a connection with the original or initial AP.

The connectivity component 480 may be configured to determine, based in part on the monitoring operations, when the conditions are met to switch the wireless communications 225 from Wi-Fi network connectivity to cellular network connectivity to avoid data stall conditions or from cellular network connectivity to Wi-Fi network connectivity to reduce the operational cost of the services being used to provide network access. In some implementations, the connectivity component 480 may generate an indication (such as a first type of indication as described above), which is communicated to the framework 460, where the indication identifies conditions associated with a data stall such that the framework 460 can determine to activate one or more intelligent connectivity switching mechanisms to change from Wi-Fi network connectivity to cellular network connectivity. In this regard, the framework 460 may perform operations or provide instructions to carry out the switch. Similarly, the connectivity component 480 may generate an indication (such as a second type of indication as described above), which is communicated to the framework 460, where the indication identifies conditions suitable for switching back wireless communications to Wi-Fi network connectivity such that the framework 460 can determine to activate one or more intelligent connectivity switching mechanisms to change from cellular network connectivity back to Wi-Fi network connectivity. In this regard, to activate one or more intelligent connectivity switching mechanisms to change the framework 460 may perform operations or provide instructions to carry out the switch back to Wi-Fi network connectivity.

In a related aspect, the indication that identifies conditions suitable for switching back wireless communications to Wi-Fi network connectivity may be part of a scan report, where the scan report has been filtered by the communicating component 440 (such as the scan report filter 482 depicted and described in FIG. 5 and FIG. 6) to prevent a situation in which connectivity simply oscillates between Wi-Fi network connectivity and cellular network connectivity. For example, if the link quality of the original or initial AP has not improved (such as by comparing metrics to respective threshold values), such AP may be removed from a scan report, or identified as not suitable in the scan report, by the filtering operation described above. By doing so, it is possible to avoid going back to the original or initial AP and then quickly have to switch the wireless communications back to a base station (such as the BS 120) because the Wi-Fi connection is again poor. In some implementations, the scan report, after being filtered or otherwise modified, may identify each of the APs 105 that satisfy the appropriate threshold values and are suitable for use in Wi-Fi network connectivity. Moreover, when more than one AP 105 is listed in the scan report as suitable for handing the wireless communications, the scan report may modified or adjusted to also provide an indication of which of the APs 105 may provide better performance.

The connectivity component 480 also may be configured to determine when to maintain an active connection with the AP1 105-*a* while also switching the wireless communications 225 from the AP1 105-*a* to the BS 120. For example, the connectivity component 480 may determine a mode (such as connected, not connected) to use with the original or initial AP 105 (such as the AP1 105-*a*) based at least in part on whether certain monitored metrics (such as SNR-related metrics, UL quality metrics, DL quality metrics, or congestion metrics) meet or satisfy respective threshold values. In some implementations, for at least some of the metrics being monitored, the threshold values used for determining whether to maintain a connection may the same as the threshold values used for determining whether to switch wireless communications to a different type of network connectivity. In some other implementations, for at least some of the metrics being monitored, the threshold values used for determining whether to maintain a connection may different from the threshold values used for determining whether to switch wireless communications to a different type of network connectivity.

FIG. 5 shows a block diagram illustrating details of a communicating component 440 in a wireless station for implementing intelligent connectivity switching mechanisms. In FIG. 5, the communicating component 440 is shown having a first layer 450 ("higher layer") with a framework 460 and a second layer 470 ("WLAN layer" or "Wi-Fi layer") with a connectivity component 480. Information may be passed between the first layer 450 and the second layer 470 via one or more signals. For example, information (such as data, control) may be communicated from second layer 470 to first layer 450 via signals 474, whereas information may be communicated from first layer 450 to second layer 470 via signals 472. In some implementations, messages including indications or scan reports may be communicated to framework 460 via signals 474, whereas instructions for scan operations or updated threshold values may be communicated to connectivity component 480 via signals 472. As described above, each layer may have one or more interfaces (not shown) that allows the layer to communicate with another layer. In some implementations, the first layer 450 may have an interface to communicate with one or more higher layers (such as application layers) as well as an interface to communicate with second layer 470. Similarly, the second layer 470 may have an interface to communicate with first layer 450 as well as an interface to communicate with one or more lower layers. In some implementations, the one or more lower layers may be associated with Wi-Fi drivers or firmware. In another aspect, the signals 472 and 474 are configured or use certain protocols to allow an interface in the first layer 450 to communicate with an interface in the second layer 470.

The connectivity component 480 may include a scan report filter 482, a scanning component 484, a monitoring component 488, an indication component 496, and a connection mode selection component 497. Monitoring component 488 may be configured to monitor (such as track, measure, estimate, or identify) a value for one or more metrics associated with wireless connectivity. For example, monitoring component 488 may be configured to monitor Wi-Fi network connectivity metrics such as SNR-related metrics 490, UL or DL (quality) metrics 491, and congestion metrics 492. In some implementations, the monitoring component 488 may utilize information associated with signals received from one or more network devices (such as the downlink signals 412 from the BS 120, the downlink signals 414 from the AP1 105-*a*, the downlink signals 416 from the AP2 105-*b*, etc.) to determine one or more of the metrics described above. Moreover, the monitoring component 488 may generate requests or similar messages to be sent to network devices (such as the BS 120, the AP1 105-*a*, the AP2 105-*b*) to obtain information (such as response messages) from which to monitor one or more metrics as described above. In some implementations, signals including requests or similar messages may be sent to network devices (such as the uplink signals 411 to the BS 120, the uplink signals 413 to the AP1 105-*a*, the uplink signals 415 to the AP2 105-*b*, etc.) to request a response from which to track, measure, estimate, or identify values or other characteristics for one or more metrics.

The monitoring component 488 may perform comparisons between one or more metrics and respective threshold values (such as the thresholds 493) to determine whether the threshold values are met or satisfied. In some implementations, the one or more metrics may be based on historic information (such as the historic info 494), which may be determined, maintained, stored, or received by the monitoring component 488. That is, previously obtained or determined metric values may be used along with recently obtained or determined metric values when making comparisons to the threshold values. For example, for beacon SNR or RSSI of a particular Wi-Fi access point, the monitoring component 488 may average multiple readings over a period of time to obtain an average beacon RSSI, which can then be compared to a respective threshold value to determine whether the respective threshold value is met or satisfied. Other approaches (such as mean, minimum, maximum) may be used in which the historic info 494 is used to produce a metric value to be compared to a respective threshold value.

In some implementations, the monitoring component 488 may compare one or more metrics to respective threshold values to determine whether to switch connectivity from Wi-Fi network connectivity to cellular network connectivity or to switch connectivity from cellular network connectivity to Wi-Fi network connectivity. In such instances, the monitoring component 488 may compare one or more metrics for at least one AP 105 (such as the AP1 105-*a* or the AP2 105-*b*) to identify any AP for which the one or more metrics satisfy the respective threshold values. Based on results from operations performed by the monitoring component 488, the indication component 496 may provide a message or indication to the framework 460 via the signals 474 to perform operations or provide instructions for the appropriate switch of the wireless communications. In some implementations, the framework 460 may configure hardware or software operations of the modem 410, the RF transceiver 406, or the RF front end 404 to perform the appropriate switch of wireless communications between Wi-Fi network connectivity and cellular connectivity.

In some implementations, when a connection to the AP1 105-*a* is not maintained while a switch is made to cellular network connectivity from Wi-Fi network connectivity, operations performed by the monitoring component 488 on one or more APs 105 may be in connection with scanning operations performed by the scanning component 484 or instructed by the framework 460.

The monitoring component 488 also may be configured to compare one or more metrics to respective threshold values (such as the thresholds 493) to determine whether to maintain a connection with an original or initial Wi-Fi access point. The respective threshold value of a metric used in determining whether to maintain a connection may be the same or different from the respective threshold value for that metric when used to determine whether to switch connectivity. In this regard, the thresholds 493 may include a first subset of threshold values for switching connectivity and a second subset of threshold values for maintaining the connection to the original or initial AP 105.

The connection mode selection component 497 may be configured to identify or determine, based on the monitoring, whether a connection with the original or initial AP 105 is to be maintained. The connection mode selection component 497 may signal or provide some indication to the indication component 496 of the need to maintain the connection, and the indication component 496 in turn may provide an indication to the framework 460 via the signals 474 that the connection is being maintained. In some implementations, the framework 460 may perform operations or provide instructions to maintain the connection to the original or initial AP 105 even when the wireless communications are switched away from that AP. In another aspect, maintaining the connection to the original or initial AP may be handled by the connectivity component 480 or the connection mode selection component 497. The connection mode selection component 497 may be part of the monitoring component 488. In such a case, it is the monitoring component 488 that may signal or provide some indication to the indication component 496 of the need to maintain the connection.

After the framework 460 performs operations or provides instructions for switching wireless communications from Wi-Fi network connectivity (such as the AP1 105-*a*) to cellular network connectivity (such as the BS 120), or vice versa, to overcome data stall conditions, the framework 460 may instruct the connectivity component 480 (such as via messages in the signals 472) to perform scanning operations to identify an AP 105 with a suitable link quality to switch wireless communications back to Wi-Fi network connectivity to avoid the higher operational costs associated with cellular network connectivity. The scanning component 484 may be configured to receive instructions from the framework 460 and manage the appropriate scanning operations. In some implementations, the scanning component 484 may operate with the monitoring component 488 to track, measure, estimate, or identify one or more metrics for one or more Wi-Fi access points. The information collected from the scanning operations may be organized or formatted into the scan reports 486, which in turn may be provided to the scan report filter 482.

The scan report filter 482 may be configured to adjust, modify, or change information in the scan reports 486. For example, the scan report filter 482 may be configured to use the thresholds 483. The scan report filter 482 may be configured to retrieve, receive, or otherwise obtain the threshold values in the thresholds 483 from, for example, the framework 460. The scan report filter 482 may then compare one or more metrics of different APs 105 in a scan report or in multiple scan reports with respective threshold values. When the metrics for a particular AP 105 do not meet or satisfy the threshold values, that particular Wi-Fi access point may be identified as not suitable for handling the wireless communications and may be removed from the scan report or identified (such as tagged, labeled) in the scan report as not being suitable. In this manner, the communicating component 440 has an established mechanism to avoid oscillating between Wi-Fi network connectivity and cellular network connectivity when the link quality of the original or initial AP has not improved. That is, the original or initial AP is removed from consideration by the framework 460 unless the performance of such AP has been shown to have improved. The modified or adjusted scan reports that are produced by the scan report filter 482 may be provided to the framework 460 to enable the framework 460 make determinations of whether to switch the wireless communications. The modified or adjusted scan reports may be provided to the framework 460 via one or more signals 474.

As noted above, the framework 460 may be configured to dynamically change or modify one or more threshold values based on, for example, contextual information (such as applications running, service set identifier (SSID), etc.). As such, the framework 460 may be configured to modify one or more threshold values in the thresholds 483 or in the thresholds 493. In some implementations, the threshold values in the thresholds 483 may be different from the threshold values for the same metric in the thresholds 493.

FIG. 6 shows a block diagram illustrating details of a communicating component 440 in a wireless station for implementing intelligent connectivity switching mechanisms. The communicating component 440 is shown having the first layer 450 ("higher layer") with the framework 460, the second layer 470 ("WLAN layer" or "Wi-Fi layer") with the connectivity component 480, and a third layer 510 ("Intermediate layer") with a scan report filter 482. In this example, the scan report filter 482 is now operated or executed in the third layer 510 and separate from the connectivity component 480 as shown in FIG. 5. Information is passed between the first layer 450, the second layer 470, and the third layer 510 via one or more signals. For example, information may be communicated from the second layer 470 to the third layer 510 via the signals 518, whereas information may be communicated from the third layer 510 to the second layer 470 via the signals 516. Similarly, information may be communicated from the first layer 450 to the third layer 510 via the signals 512, whereas information may be communicated from the third layer 510 to the first layer 450 via the signals 514. As described above, each layer may have an interface (not shown) that allows it to communicate with another layer. In some implementations, the first layer 450 may have an interface to communicate with one or more higher layers (such as application layers) as well as an interface to communicate with the third layer 510. The third layer 510 may have an interface to communicate with the first layer 450, and may use the same or a different interface to communicate with the second layer 470. Similarly, the second layer 470 may have an interface to communicate with the third layer 510 as well as an interface to communicate with one or more lower layers. In some implementations, the signals 512 and 514 are configured or use certain protocols to allow interfaces in the first layer 450 and the third layer 510 to communicate with each other, whereas the signals 516 and 518 are configured or use certain protocols to allow interfaces in the third layer 510 and the second layer 470 to communicate with each other.

Figure 7:
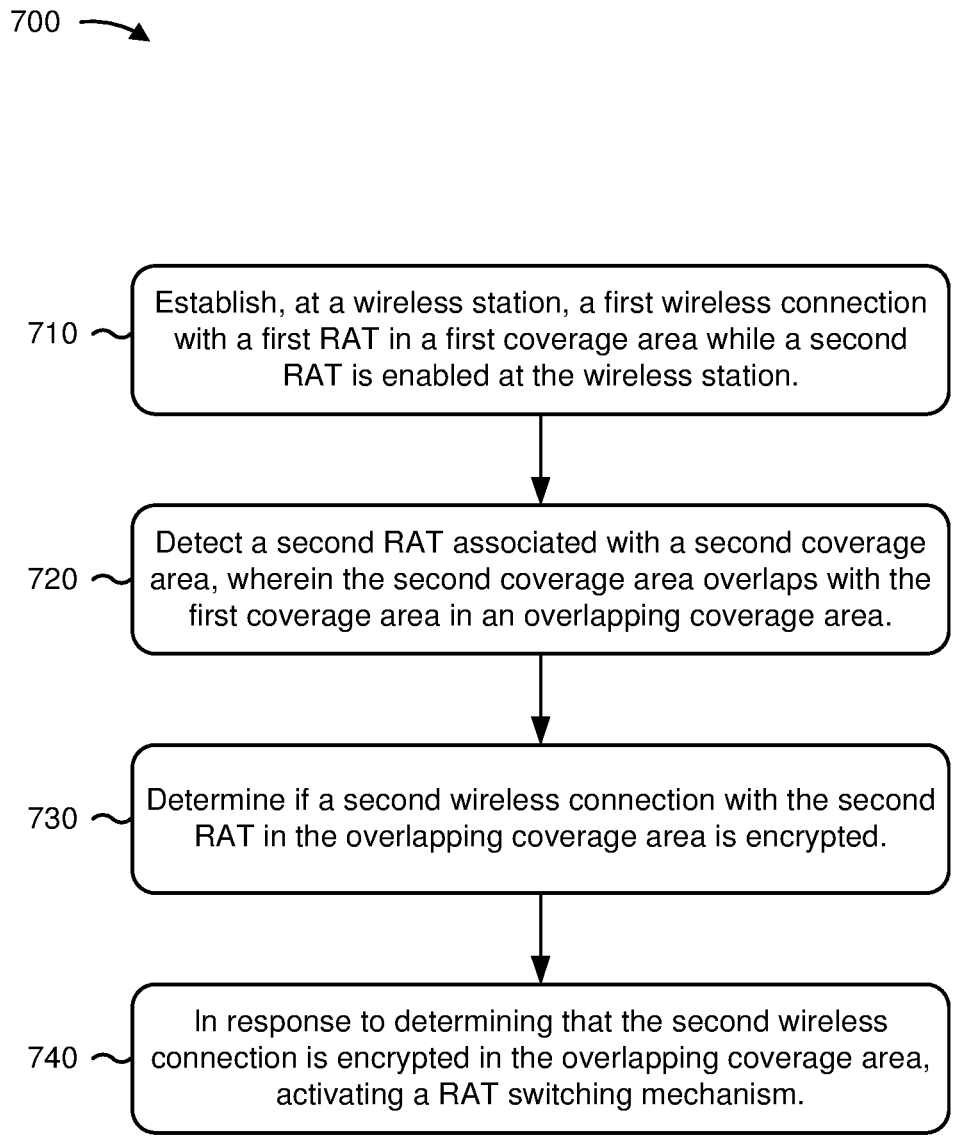
FIG. 7 is a diagram illustrating an example process performed, for example, by a wireless station.

FIG. 7 is a diagram illustrating an example process 700 performed, for example, by a wireless station. The process 700 is an example where the wireless station (such as the STAs 115-*a*-115-*c* depicted and described in FIG. 1, or another device) performs operations associated with intelligent connectivity switching mechanisms.

As shown in FIG. 7, in some aspects, the process 700 may include establishing, at a wireless station, a first wireless connection with a first radio access technology (RAT) in a first coverage area while a second RAT is enabled at the wireless station (block 710). For example, the device (such as by using the various components depicted and described in FIGS. 4-6, or the like) may establish, at a wireless station, a first wireless connection with a first RAT in a first coverage area while a second RAT is enabled at the wireless station, as described above.

As further shown in FIG. 7, in some aspects, the process 700 may include detecting a second RAT associated with a second coverage area, where the second coverage area overlaps with the first coverage area in an overlapping coverage area (block 720). For example, the wireless station (such as by using the various components depicted and described in FIGS. 4-6, or the like) may detect a second RAT associated with the second coverage area, as described above. In some aspects, the second coverage area overlaps with the first coverage area in an overlapping coverage area.

As further shown in FIG. 7, in some aspects, the process 700 may include determining if a second wireless connection with the second RAT in the overlapping coverage area is encrypted (block 730). For example, the wireless station (such as by using the various components depicted and described in FIGS. 4-6, or the like) may determine if a second wireless connection with the second RAT in the overlapping coverage area is encrypted, as described above.

The process 700 may include, in response to determining that the second wireless connection is encrypted in the overlapping coverage area, activating one or more RAT switching mechanisms. For example, the wireless station (such as by using the various components depicted and described in FIGS. 4-6, or the like) may be implemented to activate the one or more RAT switching mechanisms, as described above.

The process 700 may include additional aspects, such as any single aspect or any combination of aspects described below or in connection with one or more other processes described elsewhere herein.

In a first aspect, the RAT switching mechanism is a user interface prompt. In a second aspect, alone or in combination with the first aspect, the user interface prompt enables selection of the second RAT. In a third aspect, alone or in combination with one or more of the first and second aspects, upon selection of the second RAT, further including switching, at the wireless station, from the first wireless connection with the first RAT to the second wireless connection with the second RAT. In a fourth aspect, alone or in combination with one or more of the first through third aspects, the user interface prompt enables dismissal of switching to the second wireless connection with the second RAT.

In a fifth aspect, alone or in combination with one or more of the first through fourth aspects, the user interface prompt enables deferment of switching to the second wireless connection with the second RAT for a period of time. In a sixth aspect, alone or in combination with one or more of the first through fifth aspects, the RAT switching mechanism is based on an SNR threshold. In a seventh aspect, alone or in combination with one or more of the first through sixth aspects, if an SNR value of the first RAT exceeds the SNR threshold, maintaining the first wireless connection with the first RAT.

In an eighth aspect, alone or in combination with one or more of the first through seventh aspects, if an SNR value of the first RAT is below the SNR threshold, switching from the first wireless connection with the first RAT to the second wireless connection with the second RAT. In a ninth aspect, alone or in combination with one or more of the first through eighth aspects, switching from the first wireless connection with the first RAT to the second wireless connection with the second RAT is deferred for an amount of time. In a tenth aspect, alone or in combination with one or more of the first through ninth aspects, the amount of time is based on a lookup table.

In an eleventh aspect, alone or in combination with one or more of the first through tenth aspects, the lookup table includes one or more of the following values: the SNR value, an RSRP value, an RSRQ value, and an SINR value, and a deferment time for each of the one or more of the following values. In a twelfth aspect, alone or in combination with one or more of the first through eleventh aspects, activating the RAT switching mechanism includes comparing an active application at the wireless station to a whitelist, and if the active application is included in the whitelist, maintaining the first wireless connection with the first RAT, or if the active application is not included in the whitelist, switching from the first wireless connection with the first RAT to the second wireless connection with the second RAT.

In a thirteenth aspect, alone or in combination with one or more of the first through twelfth aspects, the active application includes one or more of the following: a gaming application, a banking application, a booking application, a digital wallet application, an e-pay application, and an e-commerce application. In a fourteenth aspect, alone or in combination with one or more of the first through thirteenth aspects, the active application is a frequently used application at the wireless station. In a fifteenth aspect, alone or in combination with one or more of the first through fourteenth aspects, the active application maintains operation in a data rate, bandwidth or throughput-constrained environment. In a sixteenth aspect, alone or in combination with one or more of the first through fifteenth aspects, the first RAT is a WWAN technology, and the second RAT is a WLAN technology.

In a seventeenth aspect, alone or in combination with one or more of the first through sixteenth aspects, the WWAN technology is one of an LTE technology, or a 5G NR technology. In an eighteenth aspect, alone or in combination with one or more of the first through seventeenth aspects, determining if the second wireless connection with the second RAT in the overlapping coverage area is encrypted includes determining if the second wireless connection is an HTTPS connection or the SSID is encrypted. In some implementations, determining if the second wireless connection with the second RAT in the overlapping coverage area is encrypted, or otherwise secure, can include determining if the Service Set Identifier (SSID) is encrypted (i.e., requires a password to access the network). In a nineteenth aspect, alone or in combination with one or more of the first through eighteenth aspects, in response to determining that the second wireless connection is not encrypted in the overlapping coverage area, maintaining the first wireless connection with the first RAT.

In a twentieth aspect, alone or in combination with one or more of the first through nineteenth aspects, detecting the second RAT associated with the second coverage area, further includes determining if RSSI values from the second RAT exceed an RSSI value threshold.

In a twenty first aspect, alone or in combination with one or more of the first through twentieth aspects, the RAT switching mechanism is based on comparing costs associated with the first RAT with costs associated with the second RAT. In a twenty second aspect, alone or in combination with one or more of the first through twenty first aspects, the RAT switching mechanism is based on one or more RAT-based profile values, including: available throughput, available bandwidth, number of ports, history of connection with the first RAT in the first coverage area, costs associated with connectivity usage of the first RAT, latency values, congestion values, noise values, and location.

Although FIG. 7 shows example blocks of the process 700, in some aspects, the process 700 may include additional blocks, fewer blocks, different blocks, or differently arranged blocks than those depicted in FIG. 7. Additionally, or alternatively, two or more of the blocks of the process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method for wireless communication, comprising:
   establishing, at a wireless station, a first wireless connection with a first radio access technology (RAT) in a first coverage area while a second RAT is enabled at the wireless station;
   detecting a second RAT associated with a second coverage area, wherein the second coverage area overlaps with the first coverage area in an overlapping coverage area;
   determining if a second wireless connection with the second RAT in the overlapping coverage area is encrypted, including determining if the second wireless connection is a Hypertext Transfer Protocol Secure (HTTPS) connection;
   comparing a signal-to-noise (SNR)-related metric of the first RAT to an associated threshold;

maintaining the first wireless connection with the first RAT when the SNR-related metric of the first RAT exceeds the associated threshold;

activating a RAT switching mechanism in response to determining that the second wireless connection is encrypted in the overlapping coverage area, and that the SNR-related metric of the first RAT is below the associated threshold; and deferring a switch from the first wireless connection with the first RAT to the second wireless connection with the second RAT for an amount of time,
wherein the amount of time is based on a lookup table, and the lookup table includes deferment times associated with one or more SNR-related metrics: a SNR value, a reference signal received power (RSRP) value, a reference signal received quality (RSRQ) value, and a signal-to-interference-plus-noise ratio (SINR) value.

2. The method of claim 1, wherein the RAT switching mechanism is a user interface prompt.

3. The method of claim 2, wherein the user interface prompt enables selection of the second RAT.

4. The method of claim 3, wherein upon selection of the second RAT, further comprising:
switching, at the wireless station, from the first wireless connection with the first RAT to the second wireless connection with the second RAT.

5. The method of claim 2, wherein the user interface prompt enables dismissal of switching to the second wireless connection with the second RAT.

6. The method of claim 2, wherein the user interface prompt enables deferment of switching to the second wireless connection with the second RAT for a period of time.

7. The method of claim 1, wherein activating the RAT switching mechanism comprises:
comparing an active application at the wireless station to a whitelist; and
if the active application is included in the whitelist, maintaining the first wireless connection with the first RAT; or
if the active application is not included in the whitelist, switching from the first wireless connection with the first RAT to the second wireless connection with the second RAT.

8. The method of claim 7, wherein the active application includes one or more of the following: a gaming application, a banking application, a booking application, a digital wallet application, an e-pay application, and an e-commerce application.

9. The method of claim 7, wherein the active application is a frequently used application at the wireless station.

10. The method of claim 7, wherein the active application maintains operation in a data rate, bandwidth or throughput-constrained environment.

11. The method of claim 1, wherein the first RAT is a wireless wide area network (WWAN) technology, and the second RAT is a wireless local area network (WLAN) technology.

12. The method of claim 11, wherein the WWAN technology is one of a Long Term Evolution (LTE) technology, or a fifth generation (5G) new radio (NR) technology.

13. The method of claim 1, wherein in response to determining that the second wireless connection is not encrypted in the overlapping coverage area, maintaining the first wireless connection with the first RAT.

14. A device for wireless communication, comprising:
a memory; and
one or more processors operatively coupled to the memory, the memory and the one or more processors configured to:
establish, at a wireless station, a first wireless connection with a first radio access technology (RAT) in a first coverage area while a second RAT is enabled at the wireless station;
detect a second RAT associated with a second coverage area, wherein the second coverage area overlaps with the first coverage area in an overlapping coverage area;
determine if a second wireless connection with the second RAT in the overlapping coverage area is encrypted, including determining if the second wireless connection is a Hypertext Transfer Protocol Secure (HTTPS) connection or a Service Set Identifier (SSID) associated with the second wireless connection is encrypted;
compare a signal-to-noise (SNR)-related metric of the first RAT to an associated threshold;
maintain the first wireless connection with the first RAT when the SNR-related metric of the first RAT exceeds the associated threshold;
activating a RAT switching mechanism in response to determining that the second wireless connection is encrypted in the overlapping coverage area, and that the SNR-related metric of the first RAT is below the associated threshold; and
defer a switch from the first wireless connection with the first RAT to the second wireless connection with the second RAT for an amount of time,
wherein the amount of time is based on a lookup table, and the lookup table includes deferment times associated with one or more SNR-related metrics: a SNR value, a reference signal received power (RSRP) value, a reference signal received quality (RSRQ) value, and a signal-to-interference-plus-noise ratio (SINR) value.

15. The device of claim 14, wherein the RAT switching mechanism is a user interface prompt.

16. The device of claim 15, wherein the user interface prompt enables selection of the second RAT.

17. The device of claim 14, wherein upon selection of the second RAT, wherein the one or more processors are further configured to:
switch, at the wireless station, from the first wireless connection with the first RAT to the second wireless connection with the second RAT.

18. The device of claim 15, wherein the user interface prompt enables dismissal of switching to the second wireless connection with the second RAT.

19. The device of claim 15, wherein the user interface prompt enables deferment of switching to the second wireless connection with the second RAT for a period of time.

20. The device of claim 14, wherein the one or more processors, when activating the RAT switching mechanism, are to:
compare an active application at the wireless station to a whitelist; and
if the active application is included in the whitelist, maintain the first wireless connection with the first RAT; or
if the active application is not included in the whitelist, switch from the first wireless connection with the first RAT to the second wireless connection with the second RAT.

21. The device of claim 20, wherein the active application includes one or more of the following: a gaming application, a banking application, a booking application, a digital wallet application, an e-pay application, and an e-commerce application.

22. The device of claim 20, wherein the active application is a frequently used application at the wireless station.

23. The device of claim 20, wherein the active application maintains operation in a data rate, bandwidth or throughput-constrained environment.

24. A non-transitory computer-readable medium storing one or more instructions for wireless communication, comprising:
one or more instructions that, when executed by one or more processors of a device, cause the one or more processors to:
establish, at a wireless station, a first wireless connection with a first radio access technology (RAT) in a first coverage area while a second RAT is enabled at the wireless station;
detect a second RAT associated with a second coverage area, wherein the second coverage area overlaps with the first coverage area in an overlapping coverage area;
determine if a second wireless connection with the second RAT in the overlapping coverage area is encrypted, including determining if the second wireless connection is a Hypertext Transfer Protocol Secure (HTTPS) connection or a Service Set Identifier (SSID) associated with the second wireless connection is encrypted;
compare a signal-to-noise (SNR)-related metric of the first RAT to an associated threshold;
maintain the first wireless connection with the first RAT when the SNR-related metric of the first RAT exceeds the associated threshold;
activating a RAT switching mechanism in response to determining that the second wireless connection is encrypted in the overlapping coverage area, and that the SNR-related metric of the first RAT is below the associated threshold; and
defer a switch from the first wireless connection with the first RAT to the second wireless connection with the second RAT for an amount of time,
wherein the amount of time is based on a lookup table, and the lookup table includes deferment times associated with one or more SNR-related metrics: a SNR value, a reference signal received power (RSRP) value, a reference signal received quality (RSRQ) value, and a signal-to-interference-plus-noise ratio (SINR) value.

25. The non-transitory computer-readable medium of claim 24, wherein the RAT switching mechanism is a user interface prompt.

26. The non-transitory computer-readable medium of claim 25, wherein the user interface prompt enables selection of the second RAT.

27. The non-transitory computer-readable medium of claim 24, wherein upon selection of the second RAT, the one or more instructions, when executed by the one or more processors, further cause the one or more processors to:
switch, at the wireless station, from the first wireless connection with the first RAT to the second wireless connection with the second RAT.

28. The non-transitory computer-readable medium of claim 25, wherein the user interface prompt enables dismissal of switching to the second wireless connection with the second RAT.

29. The non-transitory computer-readable medium of claim 25, wherein the user interface prompt enables deferment of switching to the second wireless connection with the second RAT for a period of time.

30. The non-transitory computer-readable medium of claim 24, wherein the one or more instructions, that cause the one or more processors to activate the RAT switching mechanism, cause the one or more processors to:
compare an active application at the wireless station to a whitelist; and
if the active application is included in the whitelist, maintain the first wireless connection with the first RAT; or
if the active application is not included in the whitelist, switch from the first wireless connection with the first RAT to the second wireless connection with the second RAT.

31. The non-transitory computer-readable medium of claim 24, wherein the active application includes one or more of the following: a gaming application, a banking application, a booking application, a digital wallet application, an e-pay application, and an e-commerce application.

32. The non-transitory computer-readable medium of claim 30, wherein the active application is a frequently used application at the wireless station.

33. The non-transitory computer-readable medium of claim 24, wherein the first RAT is a wireless wide area network (WWAN) technology, and the second RAT is a wireless local area network (WLAN) technology.

34. The non-transitory computer-readable medium of claim 33, wherein the WWAN technology is one of a Long Term Evolution (LTE) technology, or a fifth generation (5G) new radio (NR) technology.

35. The non-transitory computer-readable medium of claim 33, wherein in response to determining that the second wireless connection is not encrypted in the overlapping coverage area, the one or more instructions cause the one or more processors to maintain the first wireless connection with the first RAT.

36. The non-transitory computer-readable medium of claim 24, wherein the RAT switching mechanism is based on comparing costs associated with the first RAT with costs associated with the second RAT.

37. The non-transitory computer-readable medium of claim 24, wherein the RAT switching mechanism is based on one or more RAT-based profile values, including: available throughput, available bandwidth, number of ports, history of connection with the first RAT in the first coverage area, costs associated with connectivity usage of the first RAT, latency values, congestion values, noise values, and location.

38. The method of claim 1, wherein the RAT switching mechanism is based on comparing costs associated with the first RAT with costs associated with the second RAT.

39. The method of claim 1, wherein the RAT switching mechanism is based on one or more RAT-based profile values, including: available throughput, available bandwidth, number of ports, history of connection with the first RAT in the first coverage area, costs associated with connectivity usage of the first RAT, latency values, congestion values, noise values, and location.

40. The device of claim 14, wherein in response to determining that the second wireless connection is not encrypted in the overlapping coverage area, the one or more processors are to maintain the first wireless connection with the first RAT.

41. The device of claim 14, wherein the RAT switching mechanism is based on one or more RAT-based profile values, including: available throughput, available bandwidth, number of ports, history of connection with the first RAT in the first coverage area, costs associated with connectivity usage of the first RAT, latency values, congestion values, noise values, and location.

\* \* \* \* \*